US012750131B2

(12) United States Patent
Keller et al.

(10) Patent No.: US 12,750,131 B2
(45) Date of Patent: Sep. 29, 2026

(54) NETWORK NODE, TERMINAL, AND METHODS THEREIN

(71) Applicant: Telefonaktiebolaget LM Ericsson (publ), Stockholm (SE)

(72) Inventors: Ralf Keller, Würselen (DE); Afshin Abtin, Sollentuna (SE); Sorin Surdila, Laval (CA); Bo Burman, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 363 days.

(21) Appl. No.: 18/277,263

(22) PCT Filed: Feb. 26, 2021

(86) PCT No.: PCT/EP2021/054819
§ 371 (c)(1),
(2) Date: Aug. 15, 2023

(87) PCT Pub. No.: WO2022/179694
PCT Pub. Date: Sep. 1, 2022

(65) Prior Publication Data
US 2024/0129029 A1 Apr. 18, 2024

(51) Int. Cl.
*H04B 7/185* (2006.01)

(52) U.S. Cl.
CPC ................................ *H04B 7/18539* (2013.01)

(58) Field of Classification Search
CPC ........................... H04B 7/18539; H04B 7/185; H04B 7/18502; H04B 7/18526; H04B 7/18528; H04B 7/1853; H04B 7/18532
See application file for complete search history.

(56) References Cited

U.S. PATENT DOCUMENTS

2009/0164656 A1* 6/2009 Guan ................. H04N 21/4788 709/231
2014/0169286 A1* 6/2014 Xu .......................... H04W 8/02 370/329

(Continued)

FOREIGN PATENT DOCUMENTS

| | | | |
|---|---|---|---|
| CN | 109413740 | A | 3/2019 |
| GB | 2408422 | A | 5/2005 |
| WO | 2020041125 | A1 | 2/2020 |

OTHER PUBLICATIONS (UA 89611 C2), Walton et al., A Method and a Device for Reception /Transmission of Signalling Information in a Wireless Communication System (Embodiments), Feb. 2010, pp. 1-86 (Year: 2010).*

(Continued)

*Primary Examiner* — Keith Ferguson
(74) *Attorney, Agent, or Firm* — Withrow & Terranova, PLLC

(57) ABSTRACT

A method performed by a first network node serving a first terminal when handling a call between the first terminal and a second terminal is provided. The first network node determines that the call is associated with longer than expected delays between the first and second terminals. The network node provides a Long Delay Indication to at least one of said first and second terminals to indicate said longer than expected delays in the call.

16 Claims, 15 Drawing Sheets

(56) References Cited

U.S. PATENT DOCUMENTS

| | | | | |
|---|---|---|---|---|
| 2019/0207747 | A1* | 7/2019 | Durvasula | H04L 61/2592 |
| 2020/0059888 | A1* | 2/2020 | Cui | H04W 24/10 |

OTHER PUBLICATIONS

Author Unknown, "IMS Profile for Voice, Video and Messaging over 5GS," Official Document NG.114, Version 1.0, Aug. 7, 2020, GSM Association, 74 pages.

Author Unknown, "Technical Specification Group Services and System Aspects; System architecture for the 5G System (5GS); Stage 2 (Release 16)," Technical Specification 23.501, Version 16.7.0, Dec. 2020, 3GPP Organizational Partners, 450 pages.

Author Unknown, "Technical Specification Group Services and System Aspects; Procedures for the 5G System (5GS); Stage 2 (Release 16)," Technical Specification 23.502, Version 16.7.1, Jan. 2021, 3GPP Organizational Partners, 603 pages.

Ericsson, "S2-2008452: Handling of long delays when using GEO backhaul," 3GPP SA WG2 Meeting #142E, Nov. 16-20, 2020, Electronic Meeting, 2 pages.

Kumar, et al., "Techno-Economic Analysis of International Mobile Roaming," IEEE Wireless Communications, vol. 15, Issue 3, Jun. 2008, pp. 73-80.

International Search Report and Written Opinion for International Patent Application No. PCT/EP2021/054819, mailed Nov. 29, 2021, 9 pages.

* cited by examiner

NETWORK NODE, TERMINAL, AND METHODS THEREIN

This application is a 35 U.S.C. § 371 national phase filing of International Application No. PCT/EP2021/054819, filed Feb. 26, 2021, the disclosure of which is incorporated herein by reference in its entirety.

TECHNICAL FIELD

Embodiments herein relate to a first network node and a first terminal and methods therein. In some aspects, they relate to handling a call between the first terminal and a second terminal.

BACKGROUND

In a typical wireless communication network, wireless devices, also known as wireless communication devices, mobile stations, stations (STA) and/or User Equipment (UE), communicate via a Local Area Network (LAN) such as a Wi-Fi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. In subsequent 3GPP releases, a 5G System (5GS) architecture is specified, e.g., in 3GPP 23.501 and 23.502, which can use 5G New Radio (NR) for communication.

Voice Communication in 5G

Voice communication services in 5GS can be based on the Internet Protocol Multimedia Subsystem (IMS) and can communicate using Voice over NR (VoNR) or using Voice over LTE (VoLTE) after an EPS Fallback procedure Global System for Mobile Communications Association (GSMA) specifies in "*IMS Profile for Voice, Video and Messaging over 5GS*", NG.114, Version 1.0, that communicating using voice in 5G is performed using a specific Quality of Service (QoS) for voice, with quality requirements according to a Standardized 5G QoS Identifier (5QI), 5QI-5, for IMS signaling and a 5QI-1 for voice and/or audio media communication. The required QoS characteristic for voice is further defined in 3GPP TS 23.501, Section 5.7.4.

Voice Communication Over Satellite

The use of satellite links for voice is known in the context of circuit-switched voice, mostly for inter-continental or other long-distance calls wherein the satellite link is e.g. used for communication between the continents or from or to areas not covered by radio base stations. Currently 3GPP is looking into satellite scenarios in 5GS for following scenarios such as:

(i) Using a satellite link between a UE and a RAN at one endpoint, also referred to as Satellite Access (SA) and is illustrated in FIG. 1*a*, or (ii) using a satellite link in the backbone of 5GC, e.g., between CN and RAN, also referred to as Satellite Backhaul (SB) and is illustrated in FIG. 1*b*.

Voice Call Quality in Long Delay Connections

Delays in voice communication can be quite disturbing for the participating users, including both waiting time for a call setup procedure and delayed voice transfer during the call. For example, if the waiting time for call setup is too long, the caller may give up the call before setup is completed. Further, substantial delay of the actual voice transfer will be perceived as bad voice call quality. Telecommunications standardization in International Telecommunication Union Telecommunication Standardization Sector (ITU-T) has in "Recommendation G.114", since 1972, recommended at most 400 ms mouth-to-ear delay, i.e. one-way delay, for most users to be satisfied with a voice call quality. However, when one or more satellite links are used in a voice call between two terminals, one or both of the above described delay types may be significant and the above delay requirements are difficult if not impossible to meet. For some networks with other reasons for a long delay connection, e.g., when at least one of the calling and called terminals is roaming in a visited network so that there is a long delay in communication with the home network, the recommendation may also be difficult to meet even without satellite links. However, since there are few alternatives other than long delay connections, this recommendation is mostly left ignored. In some cases, fulfilling certain QoS requirements can in some scenarios be impossible, since when having a very long delay, e.g., when using satellite links, such as Geostationary (GEO) satellites, can introduce a packet delay of around 230 to 280 milliseconds (ms) while 5QI-1 used for voice has a QoS requirement of less than 100 ms packet delay budget.

SUMMARY

As a part of developing embodiments herein a problem was identified by the inventors and will first be discussed.

When a terminal is communicating over a long delay connection, its user may not be aware that a call may experience longer than expected delays. Calls over long delay connections, e.g. over satellite or roaming in a visited network, may therefore be dropped between end users even when call quality is high except for the long delay. This may be since a longer than expected delay is interpreted as a timeout or a breach of a quality requirement, e.g. QoS, for handling voice calls. In some cases, the longer than expected delay may also cause an end user to drop the call due to an unexpectedly long voice delay, e.g. as the user is not aware that the call is made over a long delay connection. In this description, the term "long delay connection" is used to denote a connection between two terminals where one or both of delay in call setup and delay of voice transfer during the call occur. Further, the terms call setup, session setup, call establishment and session establishment are used herein basically as synonyms in this context. Thus, an object of embodiments herein is to improve the user experience and quality of calls over long delay connections.

According to an aspect of embodiments herein, the object is achieved by a method performed by a first network node serving a first terminal when handling a call between the first terminal and a second terminal. The first network node determines that the call is associated with longer than expected delays between the first and second terminals. The network node then provides a Long Delay Indication to at least one of said first and second terminals to indicate said longer than expected delays in the call.

According to another aspect of embodiments herein, the object is achieved by a first terminal when handling a call between the first terminal and a second terminal. The first terminal receives a Long Delay Indication. The Long Delay Indications indicates longer than expected delays between the first and second terminals. The first terminal then adapts the first terminal to said longer than expected delays based on the Long Delay Indication.

According to another aspect of embodiments herein, the object is achieved by a first network node configured to serve a first terminal and to handle a call between the first terminal and a second terminal. The first network node further being configured to:

Determine that the call is associated with longer than expected delays between the first and second terminals, and provide a Long Delay Indication to at least one of said first and second terminals to indicate said longer than expected delays in the call.

According to another aspect of embodiments herein, the object is achieved by a first terminal configured to handle a call between the first terminal and a second terminal. The first terminal further being configured to:

Receive a Long Delay Indication indicating longer than expected delays between the first and second terminals, and adapt the first terminal to said longer than expected delays based on the Long Delay Indication.

Since the first network node determines that the call is associated with longer than expected delays between the first terminal and the second terminal and then provides a Long Delay Indication to at least one of said first and second terminals, the at least one of said first and second terminals is informed of the longer than expected delays and can thus adapt its behavior according to the longer than expected delays.

BRIEF DESCRIPTION OF THE DRAWINGS

Examples of embodiments herein are described in more detail with reference to attached drawings in which.

DETAILED DESCRIPTION

Figure 1A:
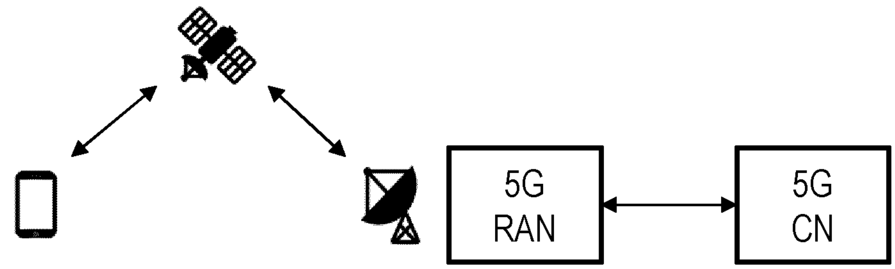
FIG. 1 is a schematic block diagram illustrating prior art.
Figure 1B:
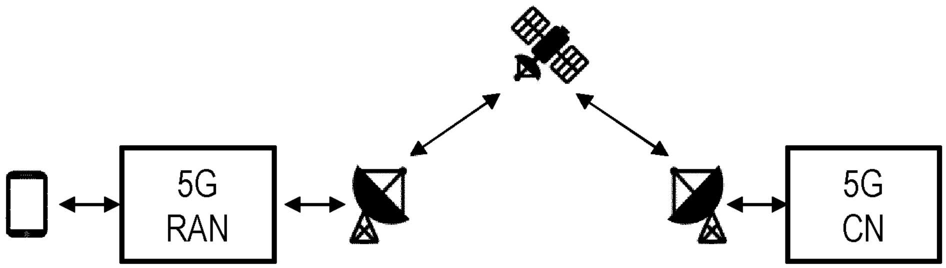

Embodiments herein may be used for indicating longer than expected delays when handling calls. Longer than expected delays when used herein means that the delays are significantly longer than what is common for backbone and backhaul for good voice performance, e.g. above 120 ms. The longer than expected delays may relate to exceeding quality requirements, e.g., exceeding thresholds relating to QoS or bad voice quality. The longer than expected delays may appear using any long delay communication, such as when at least one of the calling and called terminals is roaming in a visited network far away from a home network and/or when using one or more satellite links, e.g., any one or both of SA and SB.

For scenarios comprising SA, a subscriber, e.g. user, with a terminal, e.g. satellite phone, may be aware of the longer delays associated with the satellite link and this user may therefore be prepared to wait in the call setup and/or in the voice transfer. However, a remote user and/or the remote user's terminal may not be aware of the longer than expected delay when communicating, e.g. calling, the subscriber. The remote user and/or the remote user's terminal may therefore drop the call due to assuming the long delays are related to a poor connection or breach of QoS to the subscriber.

For scenarios comprising SB, when a satellite is used in backhaul, one or both end users and/or terminals communicating, e.g., over a voice call, may be unaware of the communication being over a satellite link, and any of the users and or the users' terminals may drop the call due to assuming the long delays are related to a poor connection or breach of QoS.

It should be noted that a user or terminal aware of the long delays as described herein may be either of the calling and called user/terminal, and it follows that either of the calling and called user/terminal may be unaware of, and unprepared for, such longer than expected delays in the call. The embodiments herein are thus useful regardless of which user/terminal, calling or called, is unaware of the longer delay.

Long delays may also impact user experience in home routed IMS roaming, e.g., home routing using the LTE S8 interface, S8 Home Routing (S8HR), or home routing using the NR N9 interface, N9 Home Routing (N9HR). In roaming scenarios herein, a roaming subscriber is in a remote network, e.g., Visited Public Land Mobile Network (VPLMN) using RAN and access in VPLMN but may use IMS in a home network, e.g., Home Public Land Mobile Network (HPLMN). When there is a significant distance between HPLMN and VPLMN, this introduces longer than expected delays e.g., for signalling during voice call setup. Thus, additional signalling between HPLMN and VPLMN is typically required for the call setup which adds delay.

Hence, while a connection for handling a voice call may be of good quality besides having a longer than expected delay, the call can still be dropped as quality requirements does not consider that a long delay is intrinsic to the connection.

To overcome these problems, embodiments herein provide a solution of how to communicate a Long Delay Indication, e.g., at call establishment or during a call, about longer than expected delays which may be caused by some property of an underlying network providing a call, e.g., when using SA, SB, or roaming far from home network. Embodiments herein may be seen as non-limited to situation of use and may apply to any scenarios where a connection comprises a longer than expected delay which may cause a terminal or a user to drop a call due to not being aware of the longer than expected delays.

Embodiments herein will improve the user experience and call quality by indicating longer than expected delays, e.g. long call setup and/or media transfer, which enables terminals, network nodes, and subscribers to be prepared for a type of communication which comprises longer delays than normally expected. This may result in that at least one of the participating terminals adjusts its behavior, e.g. displays an indication of longer than expected delays to a user, or adjusts a timeout value of the call establishment. In this way, a user and/or terminal may be notified that a call experiences longer than expected delays. The notification may indicate any one or more of that the call e.g. may take longer than usual to establish, longer to transfer media, and/or has increased voice delay. As the terminal and/or user of the terminal is notified, the user or terminal is prepared to accept longer delays associated with the call, e.g. by waiting longer for call establishment or media transfer to complete. In this way, the number of successful call setups are also improved as fewer calls will be dropped due to longer than expected delays. Furthermore, when knowing that a call is associated with longer than expected delays, it may be possible for a terminal or user to adapt to the longer than expected delays e.g. by adapting quality parameters or speaking behavior. Embodiments herein also provide a clear indication that otherwise applicable quality contracts, e.g. QoS requirements or end user satisfaction, between endpoints does not apply for this call. Instead, embodiments herein may indicate that other quality requirements or conditions may apply. This further limits the risk of operator, terminal, or user dissatisfaction by understanding the reason for the long delays.

Figure 2:
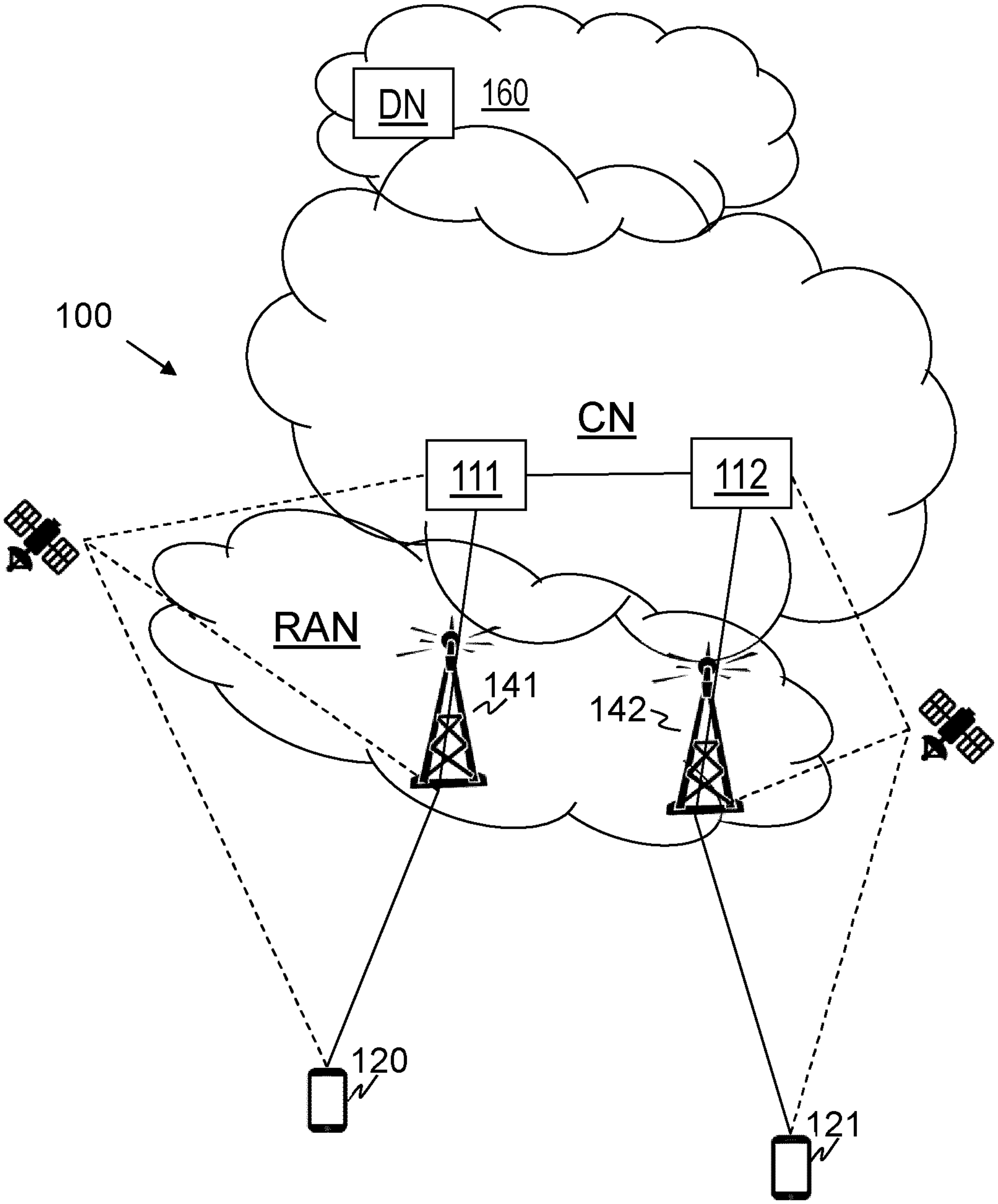
FIG. 2 is a schematic block diagram illustrating embodiments of a communications network.

FIG. 2 is a schematic overview depicting a communications network 100, wherein embodiments herein may be implemented. The communications network 100 may be a wireless communications network comprising one or more RANs and one or more CNs. The communications network 100 may use a number of different technologies, such as Wi-Fi, Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMAX), or Ultra Mobile Broadband (UMB), just to mention a few possible implementations. Embodiments herein relate to recent technology trends that are of particular interest in a 5G context, however, embodiments are also applicable in further development of the existing communication systems such as e.g. WCDMA and LTE.

A number of network nodes operate in the communications network 100 such as e.g. a first network node 111 configured to handle a call between a first terminal 120 and a second terminal 121. The first network node 111 nodes may provide radio coverage in a number of cells e.g. by means of a respective first RAN 141. In some embodiments the first network node 111 is connected to a second network node 112. In these embodiments, the second network node 112 may provide radio coverage in a number of cells e.g. by means of a respective second RAN 142. Any or both of the first and second network nodes 111, 112 may use a satellite link, e.g. SB, to communicate with their respective first and second RAN 141, 142.

The first network node 111, and the second network node 112 may be part of, or accessible by an IMS network, and may each be any of a NG-RAN node, an IMS node, a transmission and reception point e.g. a base station, a radio access network node such as a Local Area Network (LAN) access point or an Access Point Station (AP STA), an access controller, a base station, e.g. a radio base station such as a NodeB, an evolved Node B (eNB, eNodeB B), a gNB, a base transceiver station, a radio remote unit, an Access Point Base Station, a base station router, a transmission arrangement of a radio base station, a stand-alone access point or any other network unit capable of communicating with the first and/or second terminal 120, 121 such that they themselves, or in cooperation may be capable of handling a call between the first terminal 120 and second terminal 121.

In scenarios where the first and second network nodes 111, 112 are cooperating to handle a call, the nodes may be part of the same or different IMS networks. In scenarios when the first network node 111 independently handle a call between the first and second terminals 120, 121, both terminals may be connected to the first network node, e.g. using same or different RANs 141, 142.

The first network node 111 may comprise and/or use any one or more of: a first Policy Control Function (PCF), 150, a first Proxy Call Session Control Function (P-CSCF) 151, and a first serving function 152. The serving function 152 may be a Multi Media Telephony Application Server (MMTel AS), and/or a Serving Call Session Control Function (S-CSCF). The P-CSCF 151 and the serving function 152 may be distributed units e.g., in different networks, or may be co-located, e.g. in the first network node 111. This may be in scenarios when the first network node operates within or as part of an IMS network. Similarly, the second network node 112 may comprise and/or use any one or more of: a second serving function 153, a second P-CSCF 154, and a second PCF 155. The serving function 153 may be an MMTel AS, and/or an S-CSCF. The second P-CSCF 154 and the second serving function 153 may be distributed units e.g., in different networks, or may be co-located, e.g. in the second network node 112.

In the communication network 100, one or more terminals operate, such as e.g. the first terminal 120 and the second terminal 121. The first and second terminals 120, 121 may each be any of a wireless device, a wireless terminal, a stationary device, a telephone, an IoT device, a mobile station, a non-access point (non-AP) STA, a STA, and/or a UE. The first terminal 120 communicates via one or more Access Networks (ANs), e.g. the first RAN 141, to one or more CNs. Similarly, the second terminal 121 may communicate via the one or more ANs, e.g. the second RAN 142, to the one or more CNs. Any one or both of the first and second terminals 120, 121 may use a satellite link, e.g. SA, to communicate with their respective first and second RAN 141, 142.

It should be understood by the skilled in the art that the term “terminal” is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may be performed by the first terminal 120 and/or the first network node 111. As an alternative, a Distributed Node (DN) and functionality, e.g. comprised in a cloud 160 as shown in FIG. 2, may be used for performing or partly performing the methods herein.

A number of embodiments will now be described, some of which may be seen as alternatives, while some may be used in combination.

Figure 3:
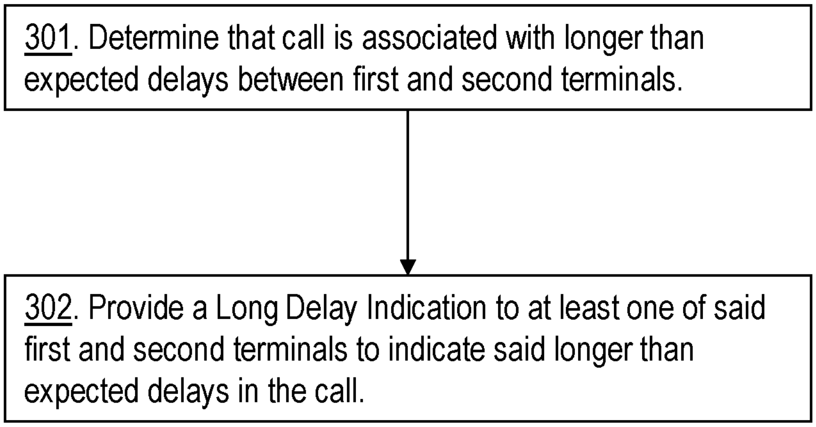
FIG. 3 is a flowchart depicting an embodiment of a method in a network node.

FIG. 3 shows example embodiments of a method performed by the first network node 111 serving a first terminal 120 when handling a call between the first terminal 120 and the second terminal 121. In some embodiments the first network node 111 is part of or accessible by an IMS. In these embodiments, the first network node 111 may comprise at least one of the P-CSCF 151 and the serving function 152 which may independently or in cooperation perform the method, or parts of the method, in a suitable manner. The method comprises the following actions, which actions may be taken in any suitable order.

Action 301

The first network node 111 determines that the call is associated with longer than expected delays between the first and second terminals 120, 121. The first network node 111 is thus now aware of the longer than expected delay in said call. The longer than expected delays between the first and second terminals 120, 121 may be caused by the first terminal 120 roaming far away from its home network. It may also be caused by use of one or more satellite links when handling the call. In some embodiments, a satellite link, e.g. SA, is used by any one or both of the first terminal 120, and the second terminal 121 for handling said call. Additionally or alternatively, a satellite link, e.g. SB, is used by any one or both of the first network node 111, and the second network node 112 for handling said call.

In some embodiments, the first network node 111 determines that the call is associated with longer than expected delays based on obtaining information of a longer than expected delay by any one or more of:

- Receiving information of a longer than expected delay from any of or both the first terminal 120 and the second terminal 121,
- obtaining information of a longer than expected delay from the Policy Control Function, PCF, 150, controlling said call, and
- obtaining information of a longer than expected delay from a stored configuration, and
- receiving information of a longer than expected delay from the second network node 112 serving the second terminal 121.

In these embodiments, information of longer than expected delays may relate to indications or information of e.g., SA, SB, or long distance roaming. The information of the longer than expected delays may comprise information about why there is a longer than expected delay, a time approximation of the longer than expected delays, either at call setup or voice/media transfer or both. The information may also comprise information of where in a connection the longer than expected delay is located, e.g., between which network entities a satellite link is used. The information may also comprise information of how many satellite links are used in the connection, and for each satellite link, which type they are, e.g. low, medium, or high earth orbit satellites. In these embodiments, using the information, the first network node 111 may be able to determine whether or not any one or both of the first terminal 120 and the second terminal 121 is aware of the longer than expected delay, e.g. when the second terminal 121 is using SA the first network node 111 may assume that the second terminal 121 is aware of the longer than expected delays but the first terminal 120 is not.

Action 302

The first network node provides a Long Delay Indication to at least one of said first and second terminals 120, 121 to indicate said longer than expected delays in the call.

Hence, one or both of the first terminal 120 and the second terminal 121 is now aware of the longer than expected delay. In this way, the first terminal 120 and/or the second terminal 121 is enabled to adapt its behaviour to ensure the quality of the call, e.g. such that the call is not dropped due to quality requirements or expectations for calls with normal delays that cannot be fulfilled for calls with longer than expected delays.

In some embodiments the Long Delay Indication indicates any one or more out of:

- At least one of the first terminal 120 and the second terminal 121 is communicating using a respective satellite access, to a respective first and second Radio Access Network, RAN 141, 142,
- a satellite backhaul is used by the first network node 111 for communication with the first RAN 141,
- a satellite backhaul is used by a second network node 112 serving the second terminal 121, for communication with the second RAN 142, and
- one or both of the first terminal 120 and the second terminal 121 are roaming in a respective visited network wherein said longer than expected delays are caused by communication between the visited network and a respective home network.

In some embodiments the first network node 111 provides the Long Delay Indication to the at least one of said first and second terminals 120, 121 comprises:

- determining whether or not the at least one of said first and second terminals 120, 121 is capable of interpreting a first Long Delay Indication,
- when determining that the at least one of said first and second terminals 120, 121 is capable of interpreting the first Long Delay Indication, providing to the at least one of said first and second terminals 120, 121, the first Long Delay Indication, and
- when determining that the at least one of said first and second terminals 120, 121 is unable to interpret the first Long Delay Indication, providing to the at least one of said first and second terminals 120, 121, a second Long Delay Indication. In these embodiments, the second indication is used as a fallback to indicate the longer than expected delays associated with the calls to terminals which may not be able to receive or interpret the first Long Delay Indication. When determining whether or not the at least one of said first and second terminals 120, 121 is capable of interpreting the first Long Delay Indication, the first network node 111 may have first obtained the capabilities of the first terminal 120 and/or the second terminal 121, e.g. by being provided directly or indirectly by the first terminal 120, the second terminal 121, the second network node 112, any of the CSCFs 151, 152, 153, 154 or any of the PCFs, 150, 155.

Hence, in some embodiments the Long Delay Indication provided to the at least one of said first and second terminals 120, 121 may be represented by a first Long Delay Indication and/or a second Long Delay Indication.

In some embodiments the first Long Delay Indication is an indication provided at a session establishment or setup of said call, e.g. as part of SIP Invite message. The first Long Delay Indication may comprise information of said call, e.g. information of the call establishment.

In some embodiments the second Long Delay Indication is a media content provided to the at least one of said first and second terminals 120, 121. The media content may be an announcement played in a media stream to the at least one of said first and second terminal 120, 121.

In some embodiments the Long Delay Indication instructs the at least one of said first and second terminals 120, 121 to adapt to said longer than expected delays based on the Long Delay Indication 120, 121. In this way, the at least one of said first and second terminals 120, 121 is not dropped due to requirements associated with the call not having longer than expected delays.

In some embodiments, providing the Long Delay Indication to at least one of said first and second terminals 120, 121 may comprise sending the Long Delay Indication, directly to the at least one of said first and second terminals 120, 121. In some embodiments, where suitable, the Long Delay Indication may be sent via, or to, any of the second network node 112, P-CSCF 151, the serving function 152, the serving function 153 and the P-CSCF 154.

Figure 4:
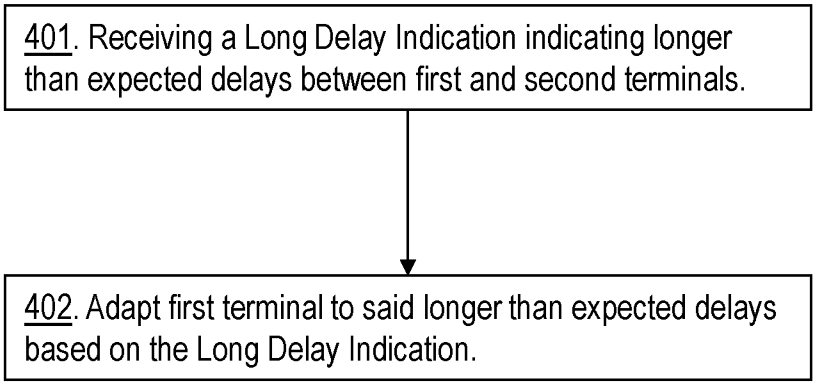
FIG. 4 is a flowchart depicting an embodiment of a method in a terminal.

FIG. 4 shows example embodiments of a method performed by the first terminal 120 when handling a call between the first terminal 120 and the second terminal 121. The method comprises the following actions, which actions may be taken in any suitable order.

Action 401

The first terminal 120 receives a Long Delay Indication indicating longer than expected delays between the first and second terminals 120, 121. In this way the first terminal 120 is informed that the call may experience longer delays than what is normal when performing a voice call, e.g. a call establishment may take longer time and media transfers may be slow.

In some embodiments, the received Long Delay Indication may relate to any of the first or second Long Delay Indication sent by the first network node 111 e.g., such as in action 302 above.

Action 402

The first terminal 120 adapts itself to said longer than expected delays based on the Long Delay Indication. This enables the first terminal 120 to act based on the longer than expected delays e.g. such that the call is not dropped by the first terminal 120 due to timeouts or breach of quality requirements or expectations for calls within normal delays that cannot be fulfilled for calls with longer than expected delays.

In some embodiments, the first terminal 120 adapts itself based on the Long Delay Indication 120, 121 by at least one of:

- displaying an indication of longer than expected delay on the first terminal, e.g. the first terminal displays an icon, or a text message, informing the user that the call is associated with a longer than expected delay,
- playing a media content, e.g. the first terminal 120 receives a media announcement, using any one or both of audio and video, which is played out by the first terminal 120,
- adjusting a Quality of Service, QoS, parameter, e.g. any quality requirement regarding delays of the call may be adjusted to account for the longer than expected delay, and
- adjusting one or both of a timer value and a timeout value associated with said call, e.g. a timeout for handling a call establishment may be adapted to a latency of two or more connection hops via satellite link.

In some embodiments, the timers may relate to services like call diversion no reply, assuming this takes very long time Call Diversion is specified in 3GPP TS 24.604. They may also relate to lower level timers for the signalling bearer with QCI and/or 5QI 5.

Timers may in some embodiments be adjusted to be set such that one or two satellite hops, e.g. connections over satellite links, is within the timer limit.

The above embodiments will now be further explained and exemplified below. The embodiments below may be combined with any suitable embodiment above.

Embodiments herein relates to handling a call between the first terminal 120 and the second terminal 121 and some examples of how the embodiments may be used in practice will now be described. The embodiments herein may be used in any of the below example scenarios:

- SA at one end of the call, where one terminal of the first and second terminals 120, 121 is aware of the satellite usage, and thus is aware of a longer than expected delay, and where another terminal of the first and second terminals 120, 121 is not aware of satellite usage but is made aware using embodiments herein.
- SB is used at one or both ends of a call, e.g. a satellite link between the first network node 111 and the first RAN 141, and/or a satellite link between the second network node 112 and the second RAN 142. In these scenarios, the network node using SB is aware of the satellite link and thus also aware of the longer than expected delay. However, neither of the first and second terminals 120, 121 is aware of the longer than expected delays and may need to be informed.
- When any one or both of the first terminal 120 and the second terminal 121 is roaming with VPLMN far away from HPLMN. In this way, there is a longer than expected delay due to the distance between the home network and the visited network. The longer than expected delays may be known by the roaming terminal, e.g. first or second terminal 120, 121, or its serving network node, e.g. first network node 111 or second network node 112 wherein the roaming terminal and/or the serving network node may need to inform any one or more of the other terminals 120, 121, network nodes 111, 112, and/or P-CSCF/serving function 151, 152, 153, 154 of the longer than expected delays.

These example scenarios are only to be seen as non-limiting examples and may also occur concurrently, e.g. the first terminal 120 may be roaming while using SA.

Uses Cases for Both Satellite Access and Satellite Backhaul

In some embodiments when the first network node 111 may receive, e.g. by the P-CSCF 151, a notification, e.g. from PCF 150, comprising information of status of SA, SB, and/or roaming status. The first network node may then, e.g. by means of the P-CSCF 151, indicate longer than expected delays of said call in a SIP message, e.g. SIP request or SIP response sent towards any one or both of the first terminal 120 and the second terminal 121.

Capability of Interpreting Long Delay Indications

In some embodiments, SIP-level indications provided by any of the first and second terminal 120, 121 or provided by the first and second network node, e.g. by means of P-CSCF 151, 154 or serving function 152, 153, may not supported by the receiving terminal, e.g. the first and/or second terminals 120, 121. In some of these embodiments, any one or both of the first and second terminals 120, 121 may indicate its capability to interpret Long Delay Indications, e.g. by transmitting a capability indication to the first network node 111, the second network node 112, the first terminal 120, and/or the second terminal 121. Capability to interpret Long Delay Indications may relate to a capability of displaying on the screen of the respective terminal, long-delay call indications, e.g. icons or text messages, or otherwise adapting the behavior of the first or second terminal 120, 121, e.g. by adjusting quality parameters relating to the call.

When the first network node 111 has received a capability indication indicating that at least one of the first and second terminals 120, 121 is not capable of interpreting a Long Delay Indication, e.g. the first Long Delay Indication as in action 302 above, the first network node 111 may instead use a fallback Long Delay Indication, e.g. the second Long Delay Indication as in action 302 above, and may then play an announcement, e.g. an audio message, about the long-delay call to, and played out by, the at least one of the first and second terminals 120, 121.

In embodiments comprising SA between at least one of the first and second terminal 120, 121 and their respective first and second RAN 141, 142, the at least one of the first and second terminal 120, 121 will provide information of longer than expected delays during call setup signalling e.g. by transmitting a Long Delay Indication with a SIP Request or a SIP Response to the first network node 111.

In Embodiments comprising SB between at least one of the first and second network node 111, 112 and their respective first and second RAN 141, 142, the at least one of the first and second network node 111, 112 may provide the Long Delay Indication to the first and second terminals 120, 121 before the call, e.g. by means of the respective P-CSCF 151, 154, during IMS Registration. In these embodiments, the at least one of the first and second network node 111, 112, may obtain information of SB from stored configurations, received from the Packet Core, and/or may be predefined by an operator.

Determining Awareness

In some embodiments herein, the first network node 111 may determine which of the first terminal 120 and the second terminal 121 has prior knowledge of longer than expected delays based on the received information of the longer than expected delays, e.g. as in action 302. In an example scenario when the first terminal 120 is using a satellite link, e.g. SA to the first RAN 141, the first terminal 120 is aware of a longer than expected delay and transmits this information to the first network node 111. The first network node 111 may, since the information is provided by the first terminal 120, determine implicitly that the first terminal 120 already has information of the longer than expected delay. This may imply that the second terminal 121 does not have information of the longer than expected delay. Similarly in example scenarios when the second terminal 121 is using a satellite link, e.g. SA to the second RAN 142, the second terminal 121 may have provided information of the longer than expected delay to the first network node 111, e.g. transmitted directly to the first network node 111 or via the second network node 112. In these embodiments, this may imply that the first terminal 120 does not have information of the longer than expected delay.

In embodiments where information of the longer than expected delays is obtained from the PCF 150, a stored configuration, or received from the second network node 112, e.g. as in action 302, the information of the longer than expected delays may comprise information of that the first network node 111, or the second network node 112 is using a satellite link, e.g. SB to the first RAN 141 or the second RAN 142 respectively, for handling said call. This may indicate that neither the first terminal 120, nor the second terminal 121 is aware of the longer than expected delay. Hence, the first network node 111 may need to provide a Long Delay Indication to both the first terminal 120 and the second terminal 121.

Second Long Delay Indication

When providing a Long Delay Indication to a terminal, e.g. the first terminal 120, if the UEs do not have support for receiving and interpreting the indication. It is thus possible, e.g. for the first network node 111, to instead provide a second Long Delay Indication to toward to a terminal, e.g. first terminal 120, without support to interpret the first Long Delay Indication.

Providing the second Long Delay Indication may in some embodiments be subject to an operator configurable policy. The second Long Delay Indication is particularly useful for users with terminals, e.g. the first terminal 120, which are not capable to support first Long Delay Indications, e.g. as they may receive some fallback indication of the longer than expected delay even if it is not possible for the user's terminal, e.g. the first terminal to interpret the first Long Delay Indication. In some embodiments, the operator may decide to send second Long Delay Indications all terminals regardless of their capabilities of interpreting the first Long Delay Indication.

Example Scenarios

FIGS. 5-9 depict possible example scenarios where at least some of the embodiments herein are used. The scenarios comprise implementations when the communications network 100 is a 3GPP network and wherein the first network node 111 is part of or accessible by an IMS system. However, the presented example scenarios also apply to any other types of communications systems wherever possible.

The following parameters are used in example scenarios below:

- Long Delay (LD) Info, comprising information of long delay connections in the call between the first terminal 120 and the second terminal 121. The LD Info may comprise usage SA, SB and/or roaming status relating to the network nodes 111, 112 or the terminals 120, 121. Sending a message comprising LD Info may be providing a long delay indication, e.g. as in action 302. This may be a first Long Delay Indication.
- Long Delay Support Information (LDSI) comprising information of the capability of a terminal, e.g. the first or second terminal 120, 121, to interpret LD Info. The LDSI may comprise information of the capability for a terminal to interpret first Long Delay Indications.
- SA Info comprising info of usage of SA, e.g. comprising which terminal is using SA, e.g. with which RAN.
- SB Info comprising info of usage of SB, e.g. comprising which network node is using SB, e.g. with which RAN.

The following messages may be used in and embodiments herein and in the example scenarios below:

- SIP Invite messages herein indicate that a terminal wish to establish a call.
- SIP 183 messages herein indicate that there is extra information for the call which is still being set up.
- SIP Ringing messages herein indicate that a terminating terminal has received the invite to establish a call, e.g. SIP Invite, and is alerting a user of the incoming call.
- SIP OK 200 messages herein indicate that a terminal is acknowledging the receipt of a message, or success of a request. E.g. successfully started or answered a call.

SIP Provisional Response Acknowledgement (PRACK) messages herein is an acknowledgment of reception on 183 Session Progress.

Figure 5:
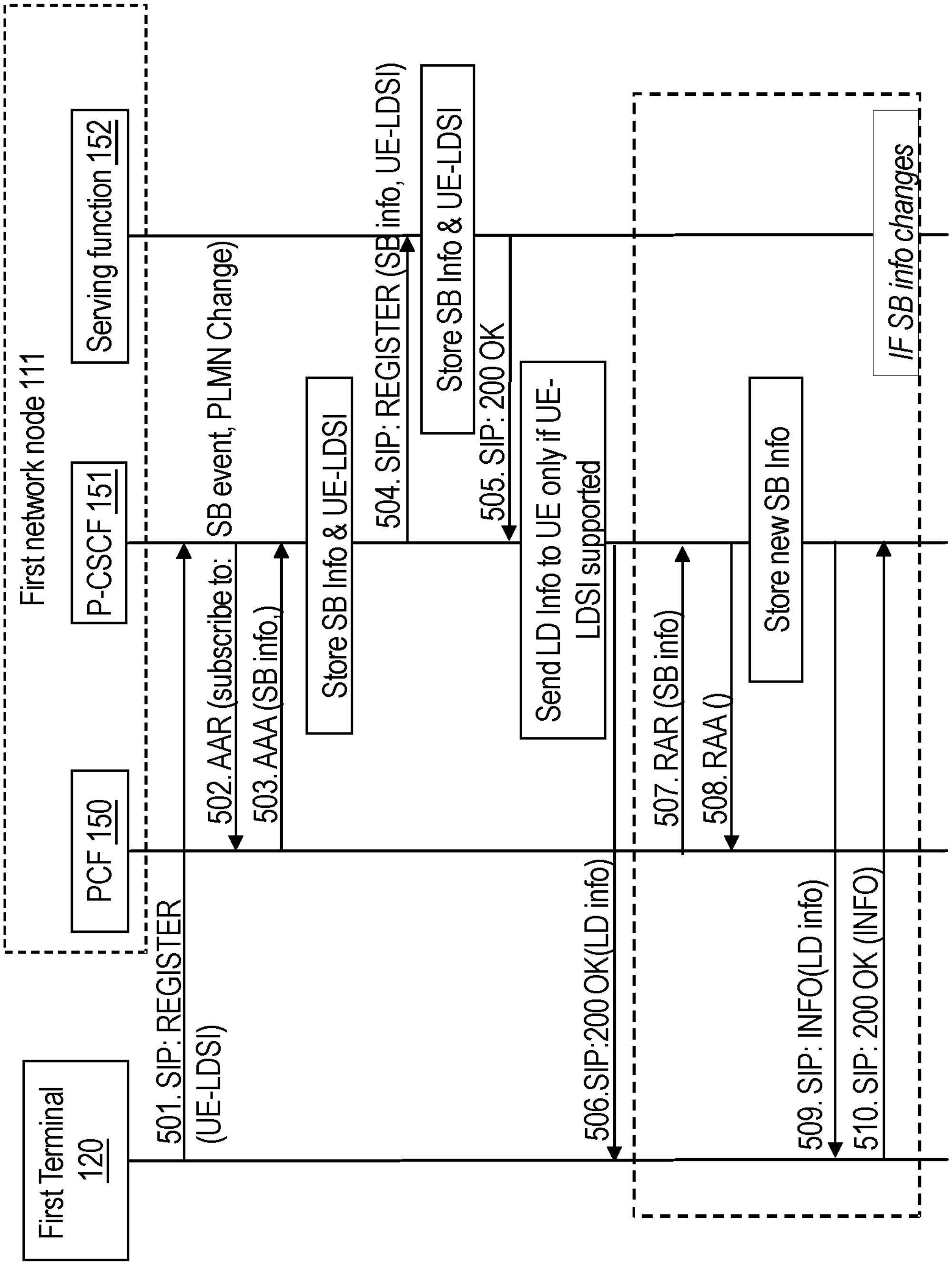
FIG. 5 is a sequence diagram depicting embodiments herein.

FIG. 5 illustrates an example scenario wherein the first network node 111 is using SB to the first RAN 141, and where the first terminal indicates its capability of interpreting first Long Delay Indications by registering with the first network node 111. In this scenario, the first network node 111 comprises the PCF 150, the P-CSCF 151, and the serving function 152. Registering with a terminal with a network node herein means a terminal creates a binding with an IMS network as part of this procedure, e.g. while also being authenticated. Registering is performed before the first terminal 120 and the network node handles 111 a call. To register to the first network node 111, the first terminal 120 transmits 501 a SIP Register comprising a LDSI to the P-CSCF 151.

The P-CSCF 151 reports 502 to the PCF 150 that the first terminal is trying to register and that the P-CSCF 151 need information of current SB status to be able to determine whether it is necessary to send a Long Delay Indication or not.

The PCF 150 responds 503 with the SB information to the P-CSCF 151, e.g. when SB information changed.

The P-CSCF 151 may then store the SB information and LDSI in e.g. a stored configuration, which may be used e.g. for future call establishments, when obtaining the SB and LDSI information. The P-CSCF 151 may store SB information to avoid unnecessary and repeated contact with its associated PCF 150, and the information will be assumed correct and valid unless new information is received from the PCF 150 indicating a change. The P-CSCF 151 then uses the information to set the SIP level indication of long delay, e.g. first Long Delay Indication.

The P-CSCF 151 transmits 504 a SIP Register to the serving function 152 comprising information of SB and LDSI. The serving function 152 may then also store the SB and LDSI information for future usage.

The serving function sends 505 back an acknowledgement of the SIP registration, e.g. a SIP 200 OK. The first terminal 120 is now registered to the first network node 111.

The P-CSCF 151 determines whether to send the LD Info if supported by the first terminal 120. In other words, the P-CSCF 151 determines whether or not the first terminal 120 is capable of interpreting the first Long Delay Indication.

The P-CSCF 151 sends 506 the Long Delay Indication, with a SIP 220 OK, only if the first terminal is, according to the transmitted LDSI, capable of interpreting the Long Delay Indication.

In case the SB info changes, e.g. if SB is added, removed, or modified, the PCF sends 507 updates SB information to the P-CSCF 151.

The P-CSCF 151 acknowledges 508 the SB information. The P-CSCF 151 sores new SB information, e.g. if updated.

If needed, e.g. if SB is in use, the P-CSCF 151 send 509 a new Long Delay Indication to the first terminal 120 as part of a SIP Info message. The Long Delay Indication may in some cases only be sent if the P-CSCF 151 previously have information of that the first terminal 120 is capable of interpreting the Long Delay Indication.

The first terminal 120 acknowledges 510 the SIP Info message.

Figure 6:
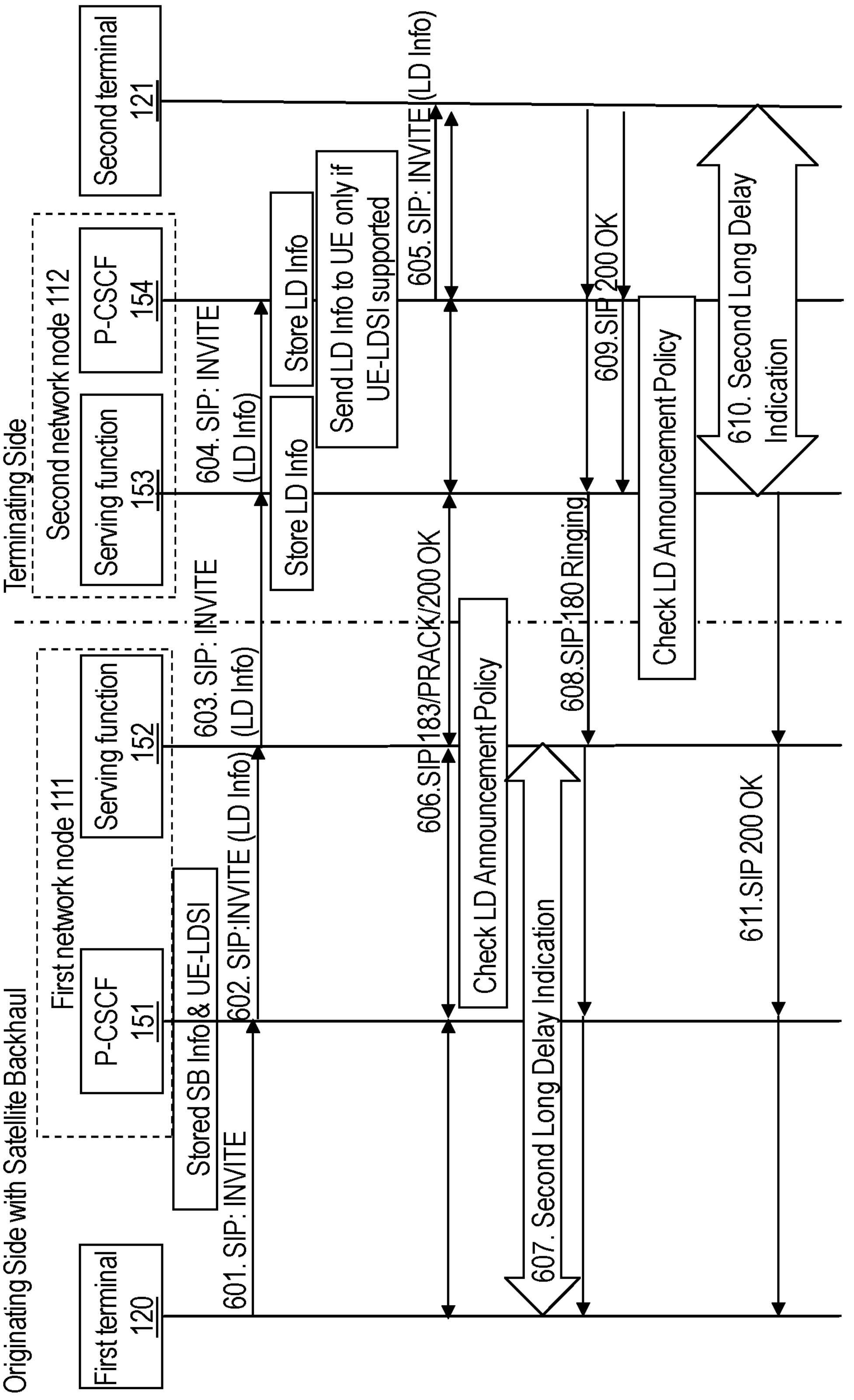
FIG. 6 is a sequence diagram depicting embodiments herein.

FIG. 6 illustrates an example scenario wherein the first network node 111 is using SB to the first RAN 141, and wherein the first and second terminals 120, 121 are not capable of interpreting first Long Delay Indications. In this example scenario, the first network node 111 comprises the P-CSCF 151, and the serving function 152. The second network node 112 comprises the serving function 153 and the P-CSCF 154.

The first terminal tries to establish a call by sending 601 a SIP Invite towards the second terminal 121.

The P-CSCF 151 obtains SB information of the first network node 111 and the LDSI of the first terminal 120, e.g. from a stored configuration. The LDSI of the first terminal 120 may alternatively have been previously communicated by the first terminal 120. The P-CSCF may, since the first network node 111 is using an SB to the first RAN 141, determine that the first terminal 120 and the second terminal 121 is unaware of the Long Delay, and thus need to be provided a Long Delay Indication.

Originating P-CSCF 151 will insert the Long Delay indication in the session setup signaling sent to the other side, to inform about the Long delay that will affect the session. The SIP invite with LD Info is thus forwarded 602, 603, 604, to the serving function 152, serving function 153, and the P-CSCF 154, by initiation of the P-CSCF 151.

The terminating side uses this indication to inform the second terminal 121, with a first Long Delay Indication, e.g. providing LD Info if supported by the second terminal 121, or second Long Delay Indication, e.g. play an announcement to the second terminal 121, to the second terminal 121.

The serving function 153 and the P-CSCF 154 stores the LD info, e.g. so it may be used for determining the need for transmitting future Long Delay Indications.

The P-CSCF 154 then forwards 605 the SIP Invite to the second terminal 121. If the second terminal is capable of interpreting first Long Delay Indications, the P-CSCF 154 includes the LD Info in the SIP invite. The P-CSCF 154 may determine whether or not the second terminal 121 is capable of interpreting first Long Delay Indications e.g. by receiving this information in the SIP invite, e.g. in the LD Info, or obtaining it from a stored configuration.

The second terminal 121 exchanges 606 messages with the first terminal 120 via P-CSCF 154, serving function 153, P-CSCF 151, and serving function 152, e.g. SIP 183, SIP PRACK, and SIP 200 OK messages. These are the standardized call flows for SIP to ensure that necessary information is exchanged between the two ends, e.g. the first and second terminals 120, 121 and enables that needed resources for a voice call are reserved at both ends.

The second terminal 121 is now enabled to send a response, e.g. SIP ringing 180, to the first terminal 120 to initiate the call between the first and second terminals 120, 121.

The first terminal 120, if it supports interpreting, e.g. displaying, first Long Delay Indications, is already aware of whether or not a longer than expected delay is associated with the call, e.g. SB is used. This is since the first terminal 120 has previously registered with the first network node 111, e.g. as in the procedure of FIG. 5. Optionally for these cases, the originating P-CSCF 151 may alternatively send a first Long Delay Indication to the first terminal 120 in all suitable messages, e.g. in messages of above action 606.

If the first terminal 120 is not capable of interpreting first Long Delay Indications, the serving function 152 checks the policy for sending Long Delay Indications, e.g. if it is configured to play an announcement to the first terminal 120, and provides 607 a second Long Delay Indication, e.g. plays a Long Delay announcement, to the first terminal 120. The first 120 is now aware of the longer than expected delay in the call.

The second terminal 121 sends 608 a message towards the first terminal 120, e.g. SIP 180 Ringing indicating to the first terminal 120, that the second terminal 121 has received the invite to establish a call and is alerting a user of the second terminal 121 call.

The second terminal 121 accepts the call, e.g. the user of the second terminal 121 answers the incoming call and sends 609 a message to the serving function 153, e.g. a SIP 200 OK, indicating to the serving function 153 that the second terminal 121 is accepting the call.

The serving function 153 checks the policy for sending Long Delay Indications, e.g. if it is configured to play an announcement to the second terminal 121, and provides 610 a second Long Delay Indication, e.g. plays a Long Delay announcement, to the second terminal 121. The second terminal 121 is now aware of the longer than expected delay in the call.

The serving function 153 forwards 611 the call acceptance, e.g. a SIP 200 OK, to the first terminal 120. The call between the first and second terminals 120, 121 is now setup and they are both aware of the longer than expected delay in the call.

Figure 7:
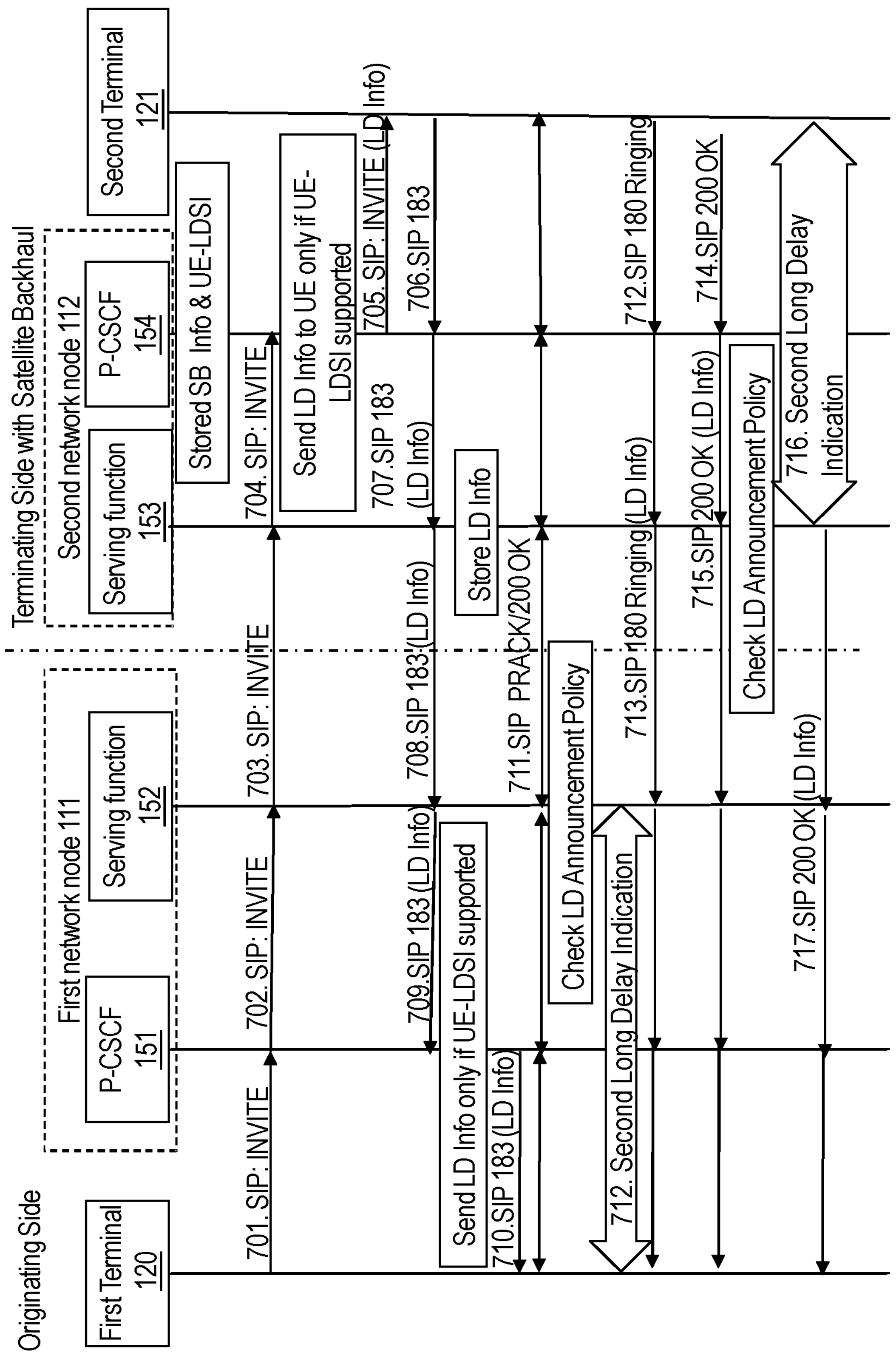
FIG. 7 is a sequence diagram depicting embodiments herein.

FIG. 7 illustrates an example scenario wherein the second network node 112 is using SB to the second RAN 142, and wherein the first and second terminals 120, 121 are not capable of interpreting first Long Delay Indications. In this example scenario, the first network node 111 comprises the P-CSCF 151, and the serving function 152. The second network node 112 comprises the serving function 153 and the P-CSCF 154.

In this example scenario, the terminating P-CSCF 154 inserts the Long Delay indication in the session setup signaling sent to the first network node 111, to inform about the longer than expected delay that will affect the session.

A SIP invite is forwarded 701, 702, 703, 704, via/to the P-CSCF 151, serving function 152, serving function 153, and the P-CSCF 154, by initiation of the first terminal 120. The P-CSCF 154 has previously stored information of SB and the LDSI of the second terminal 121.

The P-CSCF 154 then forwards 705 the SIP Invite to the second terminal 121. If the second terminal 120 is capable of interpreting first Long Delay Indications, the P-CSCF 154 includes the LD Info in the SIP invite. The P-CSCF 154 may determine whether or not the second terminal 121 is capable of interpreting first Long Delay Indications e.g. by receiving this information in the SIP invite, e.g. in the LD Info, or obtaining it from a stored configuration.

The second terminal 121 responds 706, 708, 709 to the SIP Invite by initiating a sending and forwarding the LD info towards the first terminal 120 e.g. in a SIP 183 message.

If the first terminal 120 supports interpreting first Long Delay Indications, the originating P-CSCF 151 provide 710 a first Long Delay Indication to the first terminal 120. This may be sent e.g. as a SIP 183 message comprising LD info.

The first terminal 120 exchanges 711 messages with the second terminal 121 via P-CSCF 154, serving function 153, P-CSCF 151, and serving function 152, e.g. SIP PRACK, and SIP 200 OK messages.

If the first terminal is not capable of interpreting first Long Delay Indications, the serving function 152 checks the policy for sending Long Delay Indications, e.g. if it is configured to play an announcement to the first terminal 120, and provides 712 a second Long Delay Indication, e.g. plays a Long Delay announcement, to the first terminal 120. The first 120 is now aware of the longer than expected delay in the call.

The second terminal 121 sends 712 a message towards the first terminal 120, e.g. SIP 180 Ringing indicating to the first terminal 120. The P-CSCF 154 inserts LD info into the message and forwards 713 the message, e.g. SIP 180 Ringing to the first terminal 120. This is since LD Info may be added to one of existing SIP parameters as a new parameter or possibly as a new SIP header, SIP headers are normally repeated in messages, e.g. in case the value changes during the call setup.

The second terminal 121 accepts the call, e.g. the user of the second terminal 121 answers the incoming call and sends 714 a message to the P-CSCF 154, e.g. a SIP 200 OK, indicating to the P-CSCF 154 that the second terminal 121 is accepting the call.

The P-CSCF 154 inserts the LD Info in the message and forwards 715 the message to the first terminal, e.g. in a SIP 180 Ringing.

The serving function 153 checks the policy for sending Long Delay Indications, e.g. if it is configured to play an announcement to the second terminal 121, and provides 716 a second Long Delay Indication, e.g. plays a Long Delay announcement, to the second terminal 121. The second terminal 121 is now aware of the longer than expected delay in the call.

The serving function 153 forwards 717 the call acceptance, e.g. a SIP 200 OK, to the first terminal 120. The call between the first and second terminals 120, 121 is now setup and they are both aware of the longer than expected delay in the call.

Figure 8:
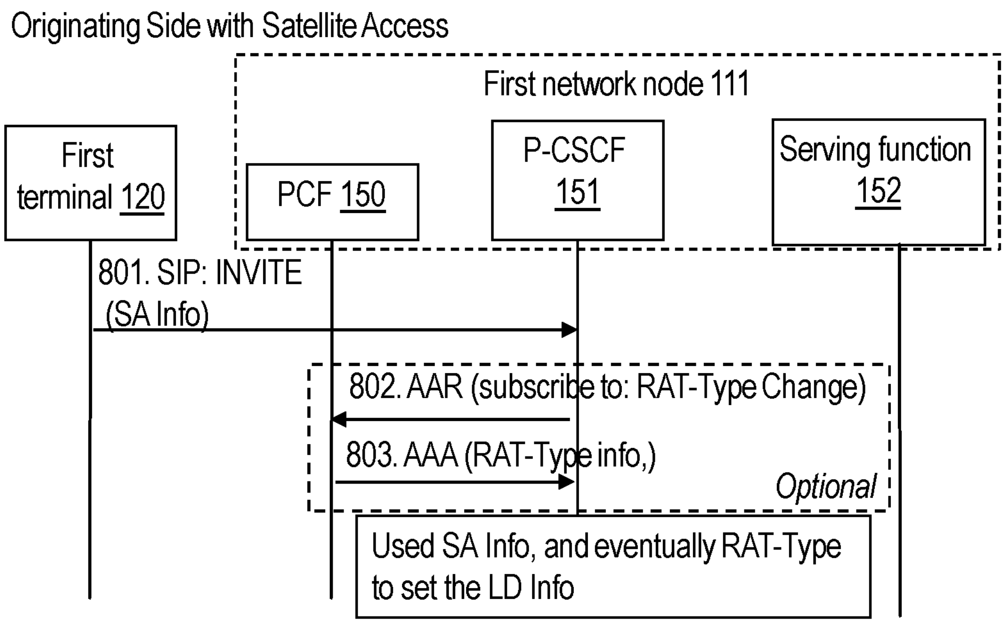
FIG. 8 is a sequence diagram depicting embodiments herein.

FIG. 8 illustrates an example scenario wherein the first terminal is using SA to the first RAN 141, and wherein the second terminal 121 is not capable of interpreting first Long Delay Indications. In this example scenario, the first network node 111 comprises the PCF 150, P-CSCF 151, and the serving function 152.

The first terminal 120 is aware of the SA, e.g. with the first RAN 141, and informs the first network node 111 accordingly by inserting SA Info in the originating SIP Invite.

The first terminal 120 then sends 801 the SIP Invite to the P-CSCF 151.

P-CSCF 151 uses the SA Info sent by the first terminal to populate the LD Info parameter to be sent in the SIP INVITE to the remote end, e.g. the second network node 112.

The operator may have a policy to validate the SA info sent by the first terminal 120. The P-CSCF 151 first subscribes 802 to RAT type change to the PCF 150 and then receives 803 RAT type information of the first terminal 120 from the PCF 150, e.g. SA used by the first terminal 120.

The example scenario may then continue to inform the second terminal 121, and network node 120 of Long delay indications by the populated LD info, e.g. as in FIG. 6 without a second Long Delay Indication transmitted to the first terminal 120 as the first terminal 120 is already aware of the longer than expected delay of the call, e.g. as in actions 603-606, and 608-610.

Figure 9:
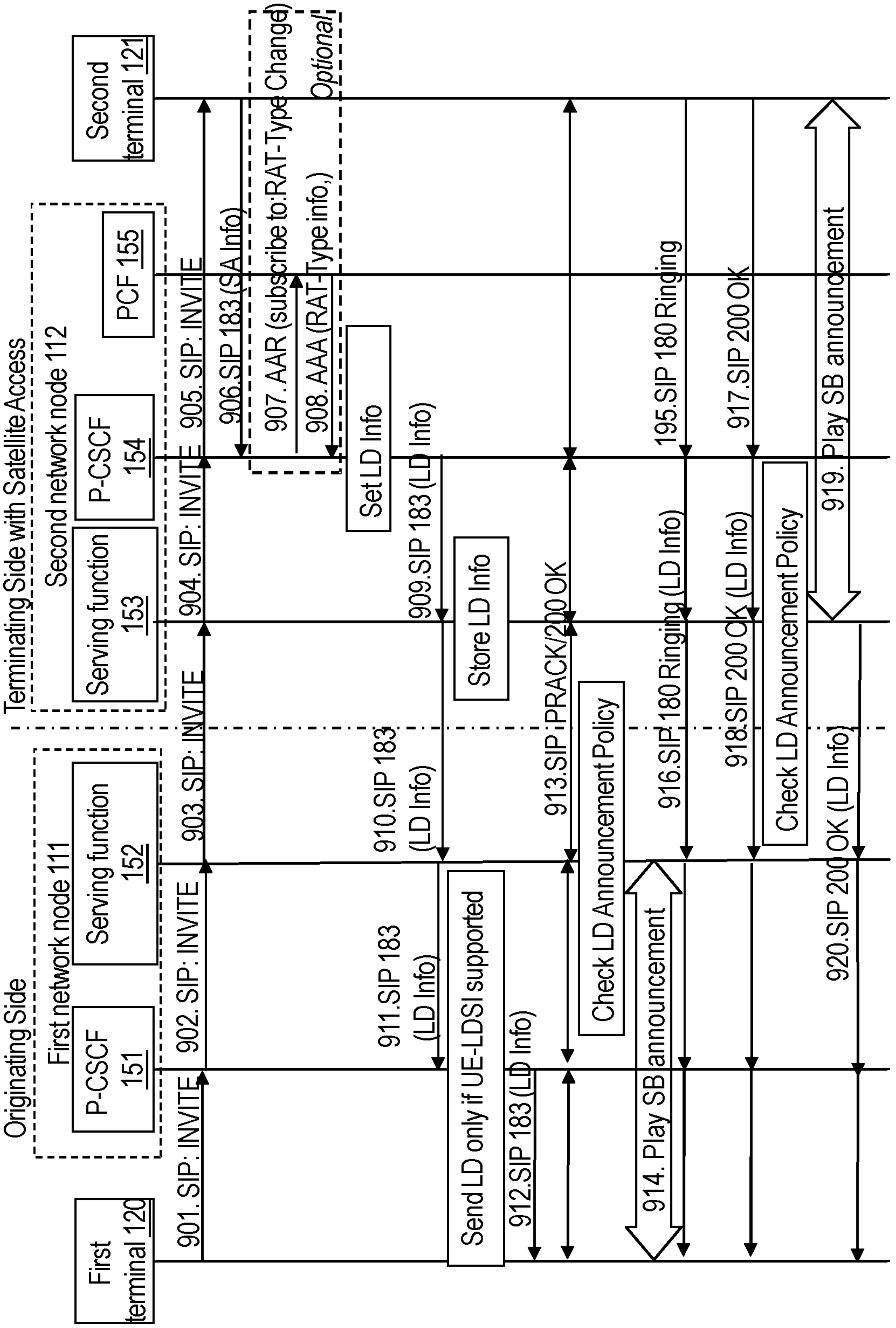
FIG. 9 is a sequence diagram depicting embodiments herein.

FIG. 9 illustrates an example scenario wherein the second terminal 121 is using SA to the second RAN 142, and wherein the first and second terminals 120, 121 are not capable of interpreting first Long Delay Indications.

In this example scenario, the first network node 111 comprises the P-CSCF 151, and the serving function 152. The second network node 112 comprises the serving function 153, the P-CSCF 154, and the PCF 155.

A SIP invite is sent 901, 902, 903, 904, 905 towards the second terminal 121 via the P-CSCF 151, serving function 152, serving function 153, and the P-CSCF 154, by initiation of the first terminal 120.

The second terminal 121 sends 906 SA info to the P-CSCF 154, e.g., in a SIP 183 message.

The operator may have a policy to validate the SA info sent by the second terminal 121. The P-CSCF 154 may then first subscribes 907 to RAT type change to the PCF 155 and may then receive 908 RAT type information of the second terminal 121 from the PCF 155, e.g. SA used by the second terminal 121.

The P-CSCF 154 sets the LD info to comprise to the received SA info. The LD info may alternatively or additionally also comprise the RAT information received from the PCF 155.

The LD Info is sent 909, 910, 911, from the P-CSCF 154, via the serving function 153, serving function 152, to the P-CSCF 151. This may be sent as a SIP 183 message comprising the LD info.

If the first terminal 120 supports interpreting first Long Delay Indications, the originating P-CSCF 151 sends 912 a first Long Delay Indication to the first terminal 120. This may be sent as a SIP 183 message comprising the LD info.

The serving function 153 stores the LD info, e.g. so it may be used for determining the need for transmitting future Long Delay Indications.

The first terminal 120 exchanges 913 messages to with the second terminal 121 via P-CSCF 154, serving function 153, P-CSCF 151, and serving function 152, e.g. SIP PRACK, and SIP 200 OK messages. If the first terminal 120 is not capable of interpreting first Long Delay Indications, the serving function 152 checks the policy for sending Long Delay Indications, e.g. if it is configured to play an announcement to the first terminal 120, and provides 914 a second Long Delay Indication, e.g. plays a Long Delay announcement, to the first terminal 120. The first terminal 120 is now aware of the longer than expected delay in the call.

The second terminal 121 sends 915 a message towards the first terminal 120, e.g. SIP 180 Ringing indicating to the first terminal 120, that the second terminal 121 has received the invite to establish a call and is alerting a user of the second terminal 121 of the call. The P-CSCF 154 inserts LD info into the message and forwards 916 the message, e.g. SIP 180 Ringing to the first terminal 120.

The second terminal 121 accepts the call, e.g. the user of the second terminal 121 answers the incoming call and sends 917 a message to the P-CSCF 154, e.g. a SIP 200 OK, indicating to the P-CSCF 154 that the second terminal 121 is accepting the call.

The P-CSCF 154 inserts the LD Info in the message and forwards 715 the message to the first terminal, e.g. in a SIP 180 Ringing.

The serving function 153 checks the policy for sending Long Delay Indications, e.g. if it is configured to play an announcement to the second terminal 121 and provides 919 a second Long Delay Indication, e.g. plays a Long Delay announcement, to the second terminal 121. Even though the second terminal 120 is aware of the SA causing longer than expected delay, the second Long Delay Indication may in some cases still be provided e.g. as network nodes may be configured to always provide a second Long Delay Indication when there is a longer than expected delay associated with the call. This may ensure that the second terminal 121, and/or the user of the second terminal 121 is aware of the longer than expected delays associated with the call.

The first and second terminals 120, 121 are now both aware of the longer than expected delay in the call.

The serving function 153 forwards 920 the call acceptance, e.g. a SIP 200 OK message, to the first terminal 120. The call between the first and second terminals 120, 121 is now setup and they are both aware of the longer than expected delay in the call.

To perform the method actions above, the first network node 111 configured to serve the first terminal 120 and to handle a call between the first terminal 120 and the second terminal 121. The first network node 111 may comprise an arrangement depicted in FIGS. 10*a* and 10*b*.

The first network node 111 may comprise an input and output interface 1000 configured to communicate with network nodes such as the second network node 112, or with terminals such as the first and second terminals 120, 121. The first network node 111 may also comprises any one or both of a P-CSCF 151 and a serving function 152 using the input and output interface 1000 to communicate with the second network node 112, e.g. the P-CSCF 154 and a serving function 153. The input and output interface 1000 may comprise a wireless receiver (not shown) and a wireless transmitter (not shown).

The first network node 111 is configured to, e.g. by means of a determining unit 1010 in the first network node 111, determine that the call is associated with longer than expected delays between the first and second terminals 120, 121.

The first network node 111 may further be configured to, e.g. by means of the determining unit 1010 in the first network node 111, determine that the call is associated with longer than expected delays based on obtaining information of a longer than expected delay by any one or more of:

- receiving information of a longer than expected delay from any of or both the first terminal 120 and the second terminal 121,
- obtaining information of a longer than expected delay from the PCF 150, controlling said call,
- obtaining information of a longer than expected delay from a stored configuration, and
- receiving information of a longer than expected delay from the second network node 112 serving the second terminal 121.

The first network node 111 is configured to, e.g. by means of a providing unit 1020 in the first network node 111, provide a Long Delay Indication to at least one of said first and second terminals 120, 121 to indicate said longer than expected delays in the call.

The first network node 111 may further be configured to, e.g. by means of the providing unit 1020 in the first network node 111, provide the Long Delay Indication to the at least one of said first and second terminals 120, 121 by:

- determining whether or not the at least one of said first and second terminals 120, 121 is capable of interpreting a first Long Delay Indication,
- when determining that the at least one of said first and second terminals 120, 121 is capable of interpreting the first Long Delay Indication, providing to the at least one of said first and second terminals 120, 121, the first Long Delay Indication, and
- when determining that the at least one of said first and second terminals 120, 121 is unable to interpret the first Long Delay Indication, providing to the at least one of said first and second terminals 120, 121, a second Long Delay Indication.

In some embodiments, the Long Delay Indication is adapted to indicate any one or more out of:

- at least one of the first terminal 120 and the second terminal 121 is communicating using a respective satellite access to the respective first and second Radio Access Network, RAN 141, 142, a satellite backhaul is used by the first network node 111 for communication with the first RAN 141, a satellite backhaul is used by a second network node 112 serving the second terminal 121, for communication with the second RAN 142, and one or both of the first terminal 120 and the second terminal 121 are roaming in a respective visited network wherein said longer than expected delays are caused by communication between the visited network and a respective home network.

In some embodiments, the first Long Delay Indication is adapted to be an indication provided at a session establishment of said call.

In some embodiments, the second Long Delay Indication is adapted to be a media content provided to the at least one of said first and second terminals 120, 121.

In some embodiments, the Long Delay Indication is adapted to instruct the at least one of said first and second terminals 120, 121 to adapt to said longer than expected delays based on the Long Delay Indication 120, 121.

In some embodiments, the first network node 111 is adapted to be part of or accessible by an Internet Protocol Multimedia Subsystem, IMS.

Figure 10A:
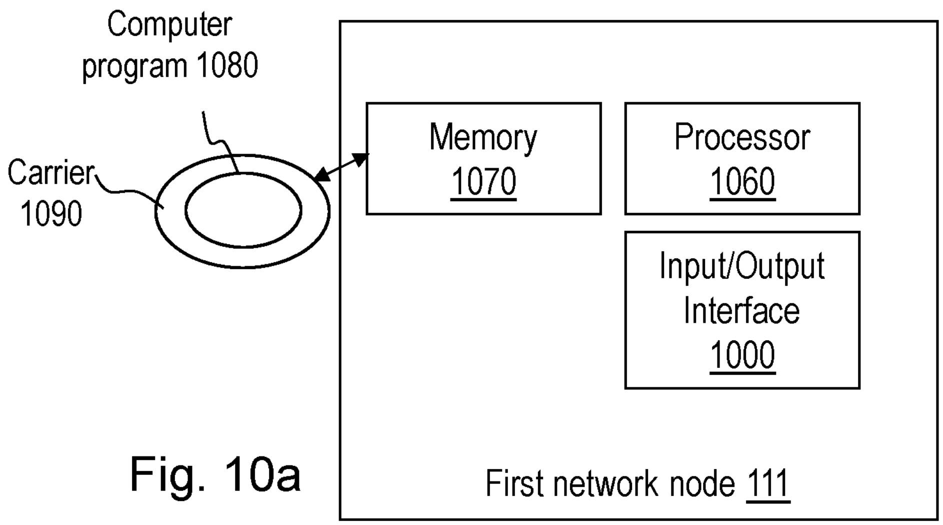
FIG. 10*a-b* are schematic block diagrams illustrating embodiments of a network node.
Figure 10B:
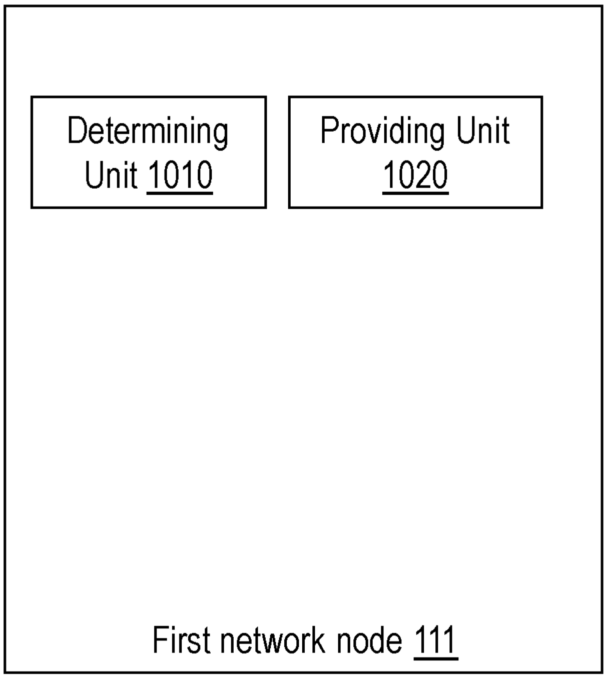

The embodiments herein may be implemented through a respective processor or one or more processors, such as the processor 1060 of a processing circuitry in the first network node 111 depicted in FIG. 10*a*, together with respective computer program code for performing the functions and actions of the embodiments herein. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1070 comprising one or more memory units. The memory 1070 comprises instructions executable by the processor in first network node 111. The memory 1070 is arranged to be used to store e.g. information, indications, data, configurations, and applications to perform the methods herein when being executed in the first network node 111.

In some embodiments, a computer program 1080 comprises instructions, which when executed by the respective at least one processor 1060, cause the at least one processor of the first network node 111 to perform the actions above.

In some embodiments, a respective carrier 1090 comprises the respective computer program 1080, wherein the carrier 1090 is one of an electronic signal, an optical signal, an electromagnetic signal, a magnetic signal, an electric signal, a radio signal, a microwave signal, or a computer-readable storage medium.

Those skilled in the art will appreciate that the units in the first network node 111 described above may refer to a combination of analog and digital circuits, and/or one or more processors configured with software and/or firmware, e.g. stored in the first network node 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

To perform the method actions above, the first terminal 120 configured to handle a call between the first terminal 120 and the second terminal 121. The first terminal 120 may comprise an arrangement depicted in FIGS. 11*a* and 11*b*.

The first terminal 120 may comprise an input and output interface 1100 configured to communicate with network nodes such as the first or second network nodes 111, 112, e.g. the P-CSCFs 151, 154 or the serving functions 152, 153, and/or the second terminal 121. The input and output interface 1100 may comprise a wireless receiver (not shown) and a wireless transmitter (not shown).

The first terminal 120 is configured to, e.g. by means of a receiving unit 1110 in the first terminal 120, receive a Long Delay Indication indicating longer than expected delays between the first and second terminals 120, 121.

The first terminal 120 is configured to, e.g. by means of an adapting unit 1120 in the first terminal 120, adapt the first terminal 120 to said longer than expected delays based on the Long Delay Indication.

The first terminal 120 may further be configured to, e.g. by means of an adapting unit 1120 in the first terminal 120, adapt the first terminal 120 based on the Long Delay Indication by at least one of:

displaying an indication of longer than expected delay on the first terminal 120, playing a media content, adjusting a Quality of Service, QoS, parameter, and adjusting one or both of a timer value and a timeout value associated with said call.

Figure 11A:
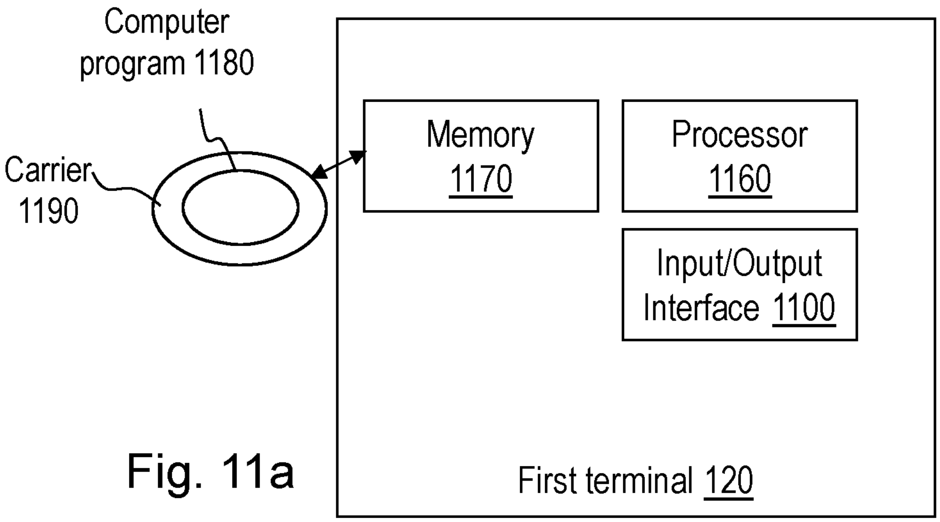
FIG. 11*a-b* are schematic block diagrams illustrating embodiments of a terminal.
Figure 11B:
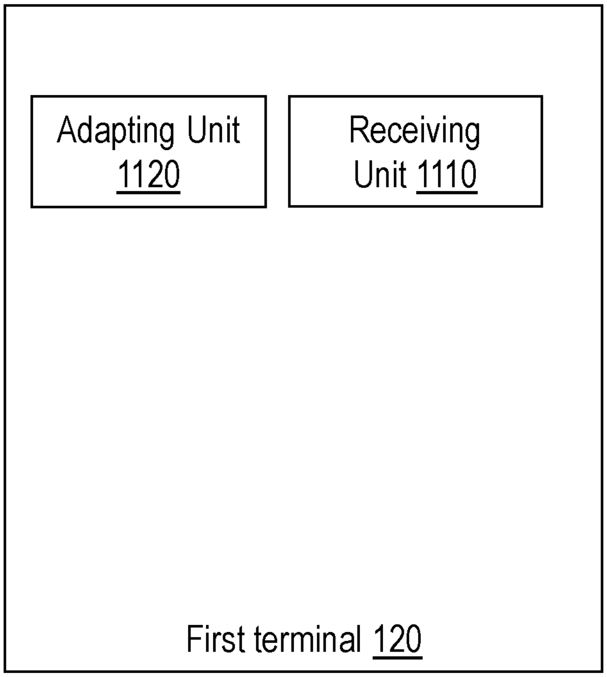

The embodiments herein may be implemented through a respective processor or one or more processors, such as the processor 1160 of a processing circuitry in the first terminal 120 depicted in FIG. 11*a*, together with respective computer program code for performing the functions and actions of the embodiments herein. The program code mentioned above may also be provided as a computer program product, for instance in the form of a data carrier carrying computer program code for performing the embodiments herein when being loaded into the first terminal 120. One such carrier may be in the form of a CD ROM disc. It is however feasible with other data carriers such as a memory stick. The computer program code may furthermore be provided as pure program code on a server and downloaded to the first terminal 120.

The first terminal 120 may further comprise a memory 1170 comprising one or more memory units. The memory 1170 comprises instructions executable by the processor in first terminal 120. The memory 1170 is arranged to be used to store e.g. information, indications, data, configurations, and applications to perform the methods herein when being executed in the first terminal 120.

In some embodiments, a computer program 1180 comprises instructions, which when executed by the respective at least one processor 1160, cause the at least one processor of the first terminal 120 to perform the actions above.

In some embodiments, a respective carrier 1190 comprises the respective computer program 1180, wherein the carrier 1190 is one of an electronic signal, an optical signal, an electromagnetic signal, a magnetic signal, an electric signal, a radio signal, a microwave signal, or a computer-readable storage medium.

Those skilled in the art will appreciate that the units in the first terminal 120 described above may refer to a combination of analog and digital circuits, and/or one or more processors configured with software and/or firmware, e.g. stored in the first terminal 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 12:
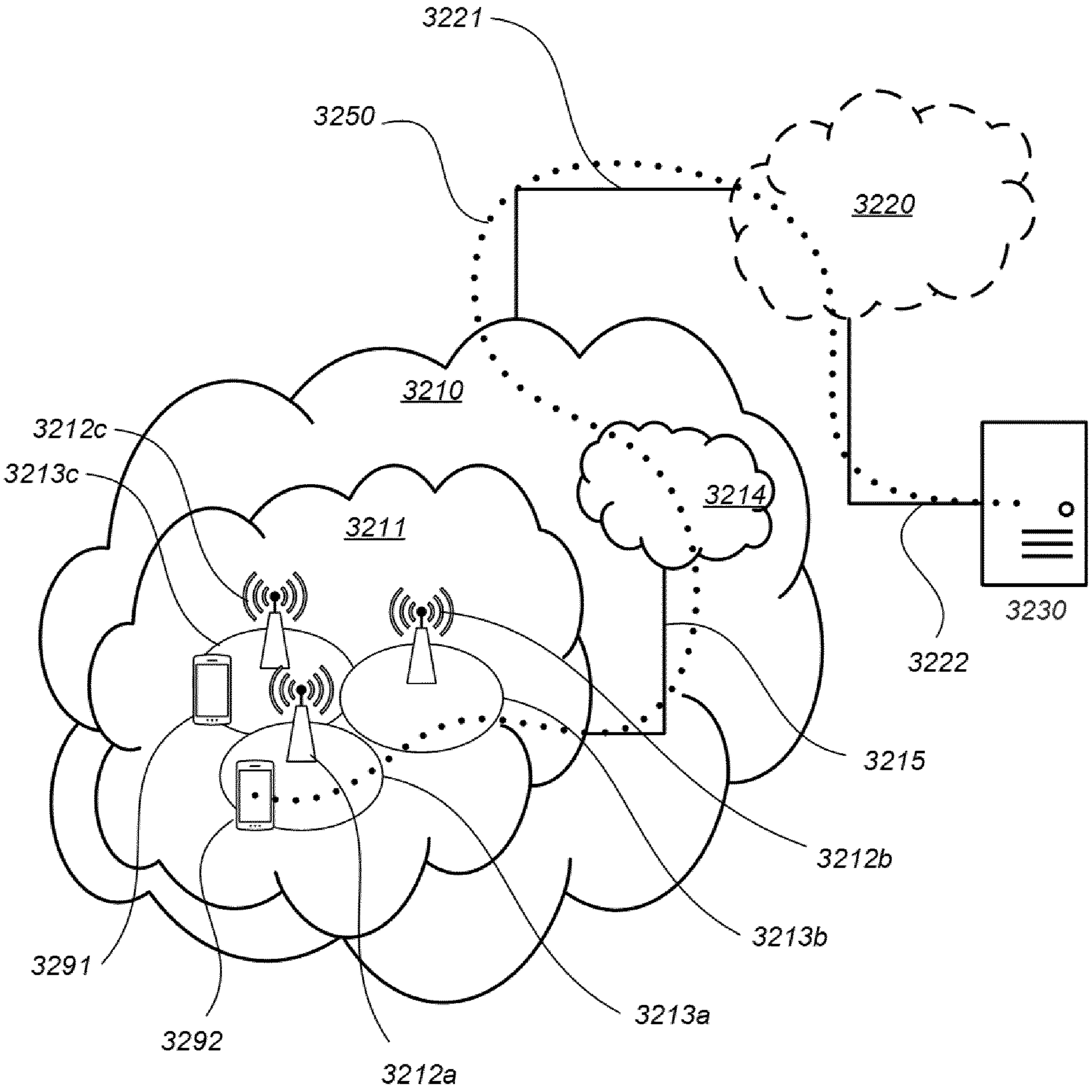
FIG. 12 schematically illustrates a telecommunication network connected via an intermediate network to a host computer.

With reference to FIG. 12, in accordance with an embodiment, a communication system includes a telecommunication network 3210, such as a 3GPP-type cellular network, e.g., the communications network 100, which comprises an access network 3211, such as a radio access network e.g., the first RAN 141 or the second RAN 142, and a core network 3214. The access network 3211 comprises a plurality of base stations 3212*a*, 3212*b*, 3212*c*, such as AP STAs NBs, eNBs, gNBs, e.g., the first network node 111 or the second network node 112, or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE), e.g., the first terminal 120, such as a Non-AP STA 3291 located in coverage area 3213*c* is configured to wirelessly connect to, or be paged by, the corresponding base station 3212*c*. A second UE 3292, e.g., the second terminal 121, such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 13 may be identical to the host computer 3230, one of the base stations 3212*a*, 3212*b*, 3212*c* and one of the UEs 3291, 3292 of FIG. 12, respectively. This is to say, the inner workings of these entities may be as shown in FIG. 13 and independently, the surrounding network topology may be that of FIG. 12.

Figure 13:
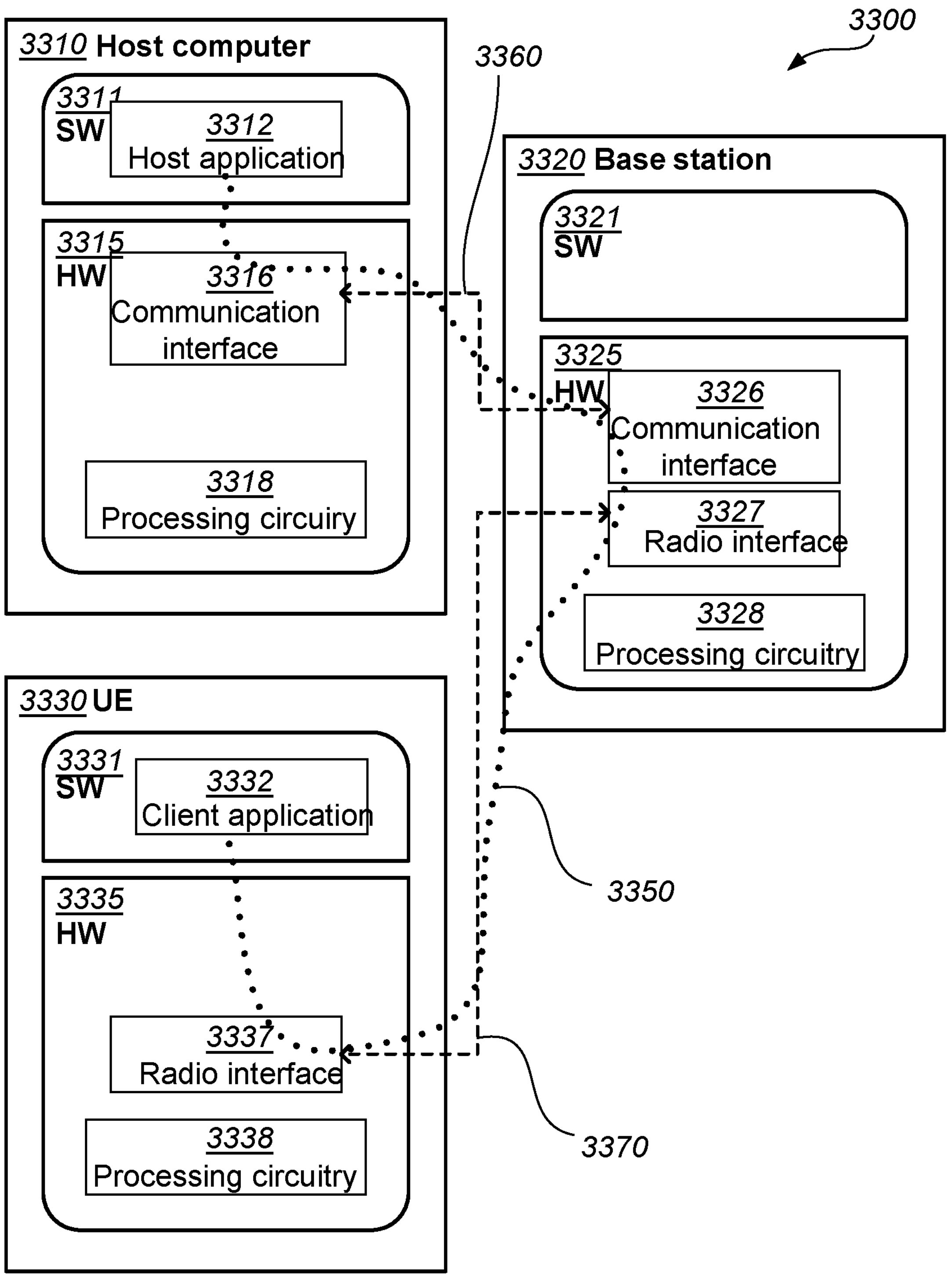
FIG. 13 is a generalized block diagram of a host computer communicating via a base station with a user equipment over a partially wireless connection.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve RAN effect: data rate, latency, power consumption and thereby provide benefits such as corresponding effect on the OTT service: reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 14:
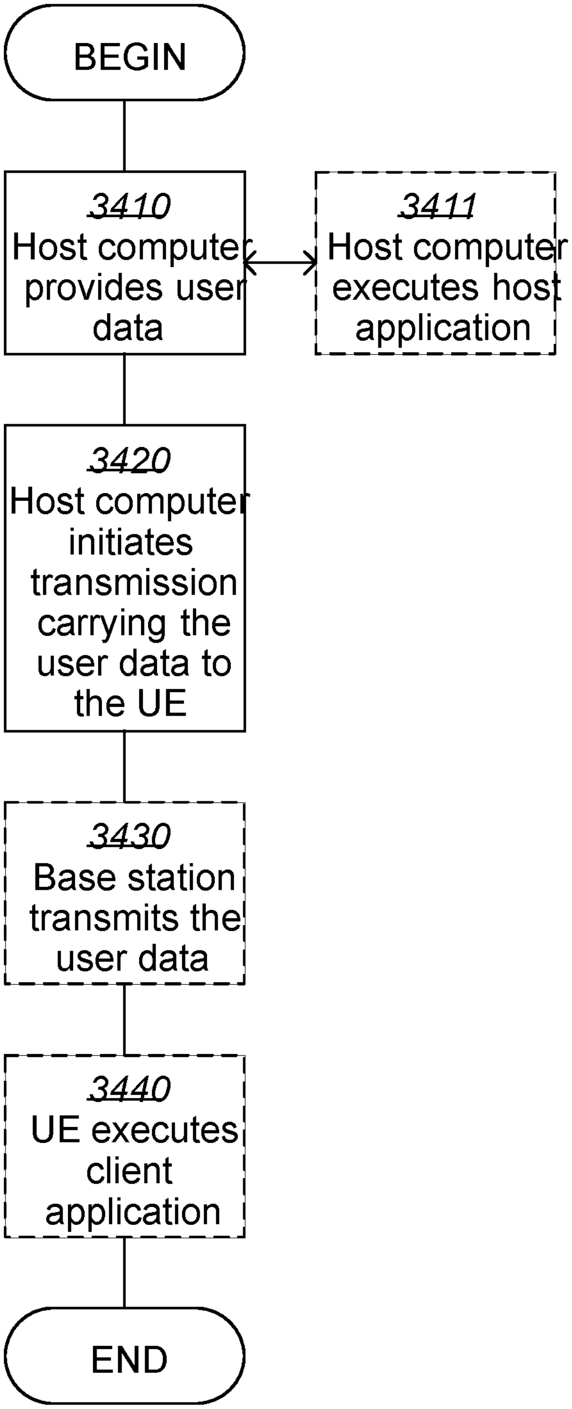
FIGS. 14-17 are flowcharts illustrating methods implemented in a communication system including a host computer, a base station and a user equipment.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 14 will be included in this section. In a first step 3410 of the method, the host computer provides user data. In an optional sub step 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 15:
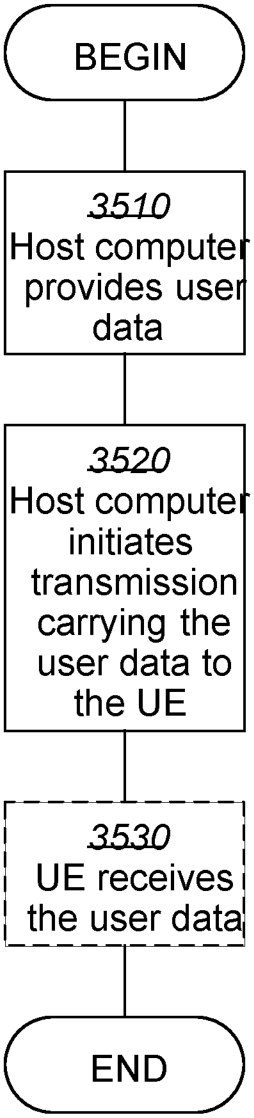

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 15 will be included in this section. In a first step 3510 of the method, the host computer provides user data. In an optional sub step (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 16:
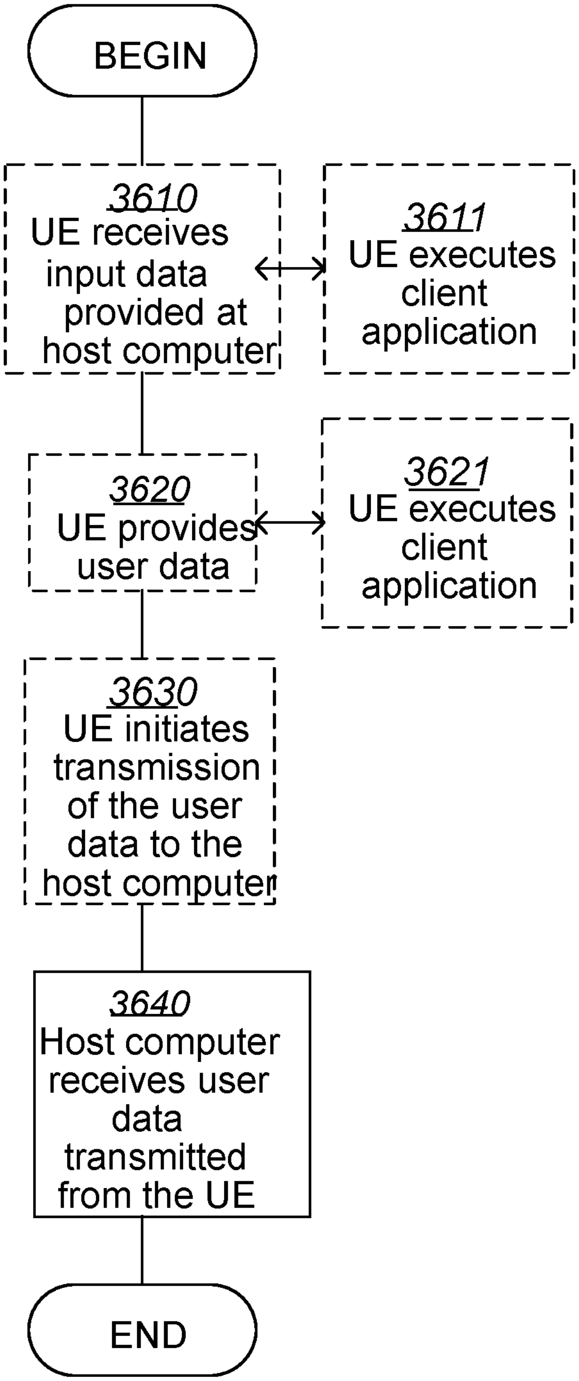

FIG. 16 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional sub step 3621 of the second step 3620, the UE provides the user data by executing a client application. In a further optional sub step 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third sub step 3630, transmission of the user data to the host computer. In a fourth step 3640 of the method, the host computer receives the user data transmitted from the UE, in accordance with the teachings of the embodiments described throughout this disclosure.

Figure 17:
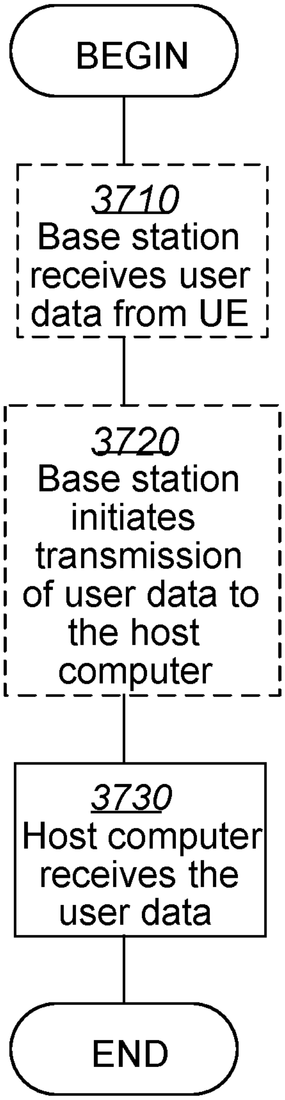

FIG. 17 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claiemd is:

1. A method performed by a first network node serving a first terminal when handling a call between the first terminal and a second terminal, the method comprising:

determining that the call is associated with longer than expected delays between the first and second terminals, and providing a Long Delay Indication to at least one of said first and second terminals to indicate said longer than expected delays in the call, wherein this providing step comprises:

determining whether or not the at least one of said first and second terminals is capable of interpreting a first Long Delay Indication, when determining that the at least one of said first and second terminals is capable of interpreting the first Long Delay Indication, providing to the at least one of said first and second terminals, the first Long Delay Indication, and when determining that the at least one of said first and second terminals is unable to interpret the first Long Delay Indication, providing to the at least one of said first and second terminals, a second Long Delay Indication, wherein the second Long Delay Indication is a media content provided to the at least one of said first and second terminals.

2. The method according to claim 1, wherein the Long Delay Indication indicates any one or more out of:

at least one of the first terminal and the second terminal is communicating using a respective satellite access to a respective first and second Radio Access Network, RAN, a satellite backhaul is used by the first network node for communication with the first RAN, a satellite backhaul is used by a second network node serving the second terminal, for communication with the second RAN, and one or both of the first terminal and the second terminal are roaming in a respective visited network wherein said longer than expected delays are caused by communication between the visited network and a respective home network.

3. The method according to claim 1 wherein determining that the call is associated with longer than expected delays is based on obtaining information of a longer than expected delay by any one or more of:

receiving information of a longer than expected delay from any of or both the first terminal and the second terminal, obtaining information of a longer than expected delay from a Policy Control Function, PCF,, controlling said call, and obtaining information of a longer than expected delay from a stored configuration, and receiving information of a longer than expected delay from a second network node serving the second terminal.

4. The method according to claim 1 wherein the first Long Delay Indication is an indication provided at a session establishment of said call.

5. The method according to claim 1 where the Long Delay Indication instructs the at least one of said first and second terminals to adapt to said longer than expected delays based on the Long Delay Indication.

6. The method according to claim 1 where the first network node is part of or accessible by an Internet Protocol Multimedia Subsystem, IMS.

7. A method performed by a first terminal when handling a call between the first terminal and a second terminal, the method comprising:

receiving a Long Delay Indication indicating longer than expected delays between the first and second terminals, wherein:

when the first terminal is capable of interpreting a first Long Delay Indication, receiving a first Long Delay Indication, and when the first terminal is unable to interpret the first Long Delay Indication, receiving a second Long Delay Indication, wherein the second Long Delay Indication is a media content received by the first terminal; and adapting the first terminal to said longer than expected delays based on the Long Delay Indication.

8. The method according to claim 7, wherein adapting the first terminal based on the Long Delay Indication comprises at least one of:

displaying an indication of longer than expected delay on the first terminal, playing a media content, adjusting a Quality of Service, QoS, parameter, and adjusting one or both of a timer value and a timeout value associated with said call.

9. A first network node configured to serve a first terminal and to handle a call between the first terminal and a second terminal, the first network node further being configured to:

determine that the call is associated with longer than expected delays between the first and second terminals, and provide a Long Delay Indication to at least one of said first and second terminals to indicate said longer than expected delays in the call, wherein the Long Delay Indication is provided by:

determining whether or not the at least one of said first and second terminals is capable of interpreting a first Long Delay Indication, when determining that the at least one of said first and second terminals is capable of interpreting the first Long Delay Indication, providing to the at least one of said first and second terminals, the first Long Delay Indication, and when determining that the at least one of said first and second terminals is unable to interpret the first Long Delay Indication, providing to the at least one of said first and second terminals, a second Long Delay Indication, wherein the second Long Delay Indication is adapted to be a media content provided to the at least one of said first and second terminals.

10. The first network node according to claim 9, wherein the Long Delay Indication is adapted to indicate any one or more out of:

at least one of the first terminal and the second terminal is communicating using a respective satellite access to a respective first and second Radio Access Network, RAN, a satellite backhaul is used by the first network node for communication with the first RAN, a satellite backhaul is used by a second network node serving the second terminal, for communication with the second RAN, and one or both of the first terminal and the second terminal are roaming in a respective visited network wherein said longer than expected delays are caused by communication between the visited network and a respective home network.

11. The first network node according to claim 9 configured to determine that the call is associated with longer than expected delays based on obtaining information of a longer than expected delay by any one or more of:

receiving information of a longer than expected delay from any of or both the first terminal and the second terminal, obtaining information of a longer than expected delay from a Policy Control Function, PCF,, controlling said call, obtaining information of a longer than expected delay from a stored configuration, and receiving information of a longer than expected delay from a second network node serving the second terminal.

12. The first network node according to claim 9 wherein the first Long Delay Indication is adapted to be an indication provided at a session establishment of said call.

13. The first network node according to claim 9 where the Long Delay Indication is adapted to instruct the at least one of said first and second terminals to adapt to said longer than expected delays based on the Long Delay Indication.

14. The first network node according to claim 9 where the first network node is adapted to be part of or accessible by an Internet Protocol Multimedia Subsystem, IMS.

15. A first terminal configured to handle a call between the first terminal and a second terminal, the first terminal further being configured:

receive a Long Delay Indication indicating longer than expected delays between the first and second terminals, wherein:

when the first terminal is capable of interpreting a first Long Delay Indication, the first terminal is configured to receive a first Long Delay Indication, and when the first terminal is unable to interpret the first Long Delay Indication, the first terminal is configured to receive a second Long Delay Indication, wherein the second Long Delay Indication is a media content; and adapt the first terminal to said longer than expected delays based on the Long Delay Indication.

16. The first terminal according to claim 15 configured to adapt the first terminal based on the Long Delay Indication by at least one of:

displaying an indication of longer than expected delay on the first terminal, playing a media content, adjusting a Quality of Service, QoS, parameter, and adjusting one or both of a timer value and a timeout value associated with said call.

* * * * *